US005539967A

United States Patent [19]

Nazerian et al.

[11] Patent Number: 5,539,967

[45] Date of Patent: Jul. 30, 1996

[54] MULTIPLE BLADE SET STRIP APPARATUS FOR CABLE AND WIRE

[75] Inventors: Greg Nazerian, Pasadena; Ronald Bailey, Alta Loma; Jack L. Hoffa, Brea, all of Calif.

[73] Assignee: Eubanks Engineering Company, Monrovia, Calif.

[21] Appl. No.: 384,751

[22] Filed: Feb. 7, 1995

Related U.S. Application Data

[63] Continuation of Ser. No. 225,913, Apr. 11, 1994, Pat. No. 5,412,856, which is a continuation of Ser. No. 22,954, Feb. 25, 1993, Pat. No. 5,343,605, which is a continuation-in-part of Ser. No. 765,986, Sep. 26, 1991, Pat. No. 5,253,555, which is a continuation-in-part of Ser. No. 659,557, Feb. 22, 1991, abandoned, which is a continuation-in-part of Ser. No. 611,057, Nov. 9, 1990, Pat. No. 5,146,673.

[51] Int. Cl.[6] .......... H02G 1/12

[52] U.S. Cl. .......... 29/33 M; 29/825; 81/9.51

[58] Field of Search .......... 81/9.51; 29/33 M, 29/748, 747, 825

[56] References Cited

U.S. PATENT DOCUMENTS

| | | |
|---|---|---|
| 1,433,320 | 10/1922 | Wersel . |
| 1,477,678 | 12/1923 | Wetmore . |
| 2,523,936 | 9/1950 | Axelsen . |
| 2,645,959 | 7/1953 | Fuchs et al. . |
| 2,671,363 | 3/1954 | Wells . |
| 2,722,145 | 11/1955 | Schulenburg . |
| 2,765,685 | 10/1956 | Stratman et al. . |
| 2,811,063 | 10/1957 | Eubanks . |
| 2,880,635 | 4/1959 | Harris . |
| 2,934,982 | 5/1960 | Eubanks . |

(List continued on next page.)

FOREIGN PATENT DOCUMENTS

| | | |
|---|---|---|
| 2525403 | 7/1984 | France . |
| 2513478 | 2/1985 | France . |
| 1084799 | 7/1960 | Germany . |
| 2927235 | 8/1980 | Germany . |
| 0423443 | 7/1990 | Germany . |
| 3926782 | 12/1990 | Germany . |
| 54-118584 | 3/1979 | Japan . |
| 1216815 | 7/1986 | U.S.S.R. . |
| 1293779 | 2/1987 | U.S.S.R. . |
| 609834 | 11/1948 | United Kingdom . |

OTHER PUBLICATIONS

Standard Logic Catalogue, "EWS-6K Electronic Wire Stripper", Feb. 1974.

Artos Catalog Sheet, "Single Blade, Fully-Automatic Wire Processing", 1989.

Komax 33 Catalogue Sheet, 1988.

French Patent Application No. 2,525,402 dated Apr. 16, 1982.

*Primary Examiner*—James G. Smith
*Attorney, Agent, or Firm*—William W. Haefliger

[57] ABSTRACT

The method of processing wire to cut the wire into sections and to strip sheathing from the wire to expose wire ends at opposite ends of the sections, and by operation of wire feed means and cutter means, the steps that include operating the feed means and cutter means to displace the wire endwise along an axis to a first position; sever the wire thereby to form wire forward and rearward sections, the forward section having a rearward end portion; and, the rearward section having a forward end portion, and; stripping sheathing from the forward section rearward portion and from the rearward section forward portion thereby to expose wire ends at the portions; the cutter means including three blade pairs, each pair including two blades located at opposite sides of the axis, both blades of one pair being displaced toward the wire to sever the wire, and both blades of the remaining two pairs being displaced toward the wire sections to strip sheathing from the rearward and forward portions during controlled endwise displacement of the sections. A sheathing slug or slugs may alternatively be relatively displaced along the wire section or sections to protectively overhang an end or ends of wire metal core, the slug or slugs not then be completely stripped from the section or sections.

33 Claims, 23 Drawing Sheets

U.S. PATENT DOCUMENTS 3,176,550 4/1965 Marcotte .
3,222,957 12/1965 Kramer et al. .
3,292,462 12/1966 Turecek et al. .
3,309,948 3/1967 Falken .
3,368,428 2/1968 Gudmestad .
3,376,627 4/1968 Sitz .
3,479,718 11/1969 Van De Kerkhof et al. .
3,552,449 1/1971 Woodward .
3,570,100 3/1971 Kindell et al. .
3,612,111 10/1971 Meyer .
3,614,905 10/1971 Bieganski .
3,645,156 2/1972 Meyer et al. .
3,653,412 4/1972 Gudmestad .
3,701,301 10/1972 Gudmestad .
3,769,681 11/1973 Eubanks .
3,838,612 10/1974 Inami .
3,857,306 12/1974 Gudmestad .
3,857,313 12/1974 Endo .
3,869,781 3/1975 Eubanks et al. .
3,872,584 3/1975 Chick et al. .
3,881,374 5/1975 Gudmestad .
3,918,330 11/1975 Blaha .
3,921,472 11/1975 Gudmestad et al. .
3,927,590 12/1975 Gudmstad et al. .
4,009,738 3/1977 Baba et al. .
4,027,557 6/1977 Stepan .
4,091,695 5/1978 Funcik et al. .
4,112,791 9/1978 Wiener .
4,156,961 6/1979 Agoh .
4,164,808 8/1979 Gudmestad et al. .
4,165,768 8/1979 Gudmestad .
4,166,315 9/1979 Gudmestad et al. .
4,175,316 11/1979 Gudmestad .
4,194,281 3/1980 Gudmestad .
4,238,981 12/1980 Karl .
4,244,101 1/1981 Talley .
4,261,230 4/1981 Sindelar .
4,266,455 5/1981 Ago .
4,275,619 6/1981 Shimizu .
4,327,609 5/1982 Resch .
4,350,061 9/1982 Isham et al. .
4,364,289 12/1982 Sorensen .
4,370,786 2/1983 Butler .
4,403,383 9/1983 Dewhurst et al. .
4,428,114 1/1984 Teagno .
4,446,615 5/1984 Talley .
4,485,735 12/1984 Jonca .
4,493,233 1/1985 Dusel et al. .
4,502,586 3/1985 Dusel et al. .
4,521,946 6/1985 Dusel et al. .
4,543,717 10/1985 Luka .
4,581,796 4/1986 Fukuda et al. .
4,584,912 4/1986 Gudmestad et al. .
4,597,179 7/1986 Goforth .
4,601,093 7/1986 Cope .
4,631,822 12/1986 Reinertz .
4,638,558 1/1987 Eaton .
4,713,880 12/1987 Dusel et al. .
4,738,019 4/1988 Kawaguchi .
4,745,828 5/1988 Stepan .
4,802,512 2/1989 Kodera .
4,827,592 5/1989 Kodera .
4,833,778 5/1989 Loustau .
4,838,129 6/1989 Cope .
4,869,135 9/1989 Hoffa .
4,932,110 6/1990 Tanaka .
4,942,789 7/1990 Hoffa et al. .
5,010,797 4/1991 Stepan .
5,016,347 5/1991 Okazaki et al. .
5,067,379 11/1991 Butler et al. .
5,109,598 5/1992 Koch .
5,142,950 9/1992 Takano et al. .
5,188,213 2/1993 Koch .
5,235,735 8/1993 Koch .
5,253,555 10/1993 Hoffa .
5,297,457 3/1994 Hoffa ...................................... 81/9.51
5,343,605 9/1994 Nazerian et al. .
5,368,212 11/1994 Koch .

FIG. 7.
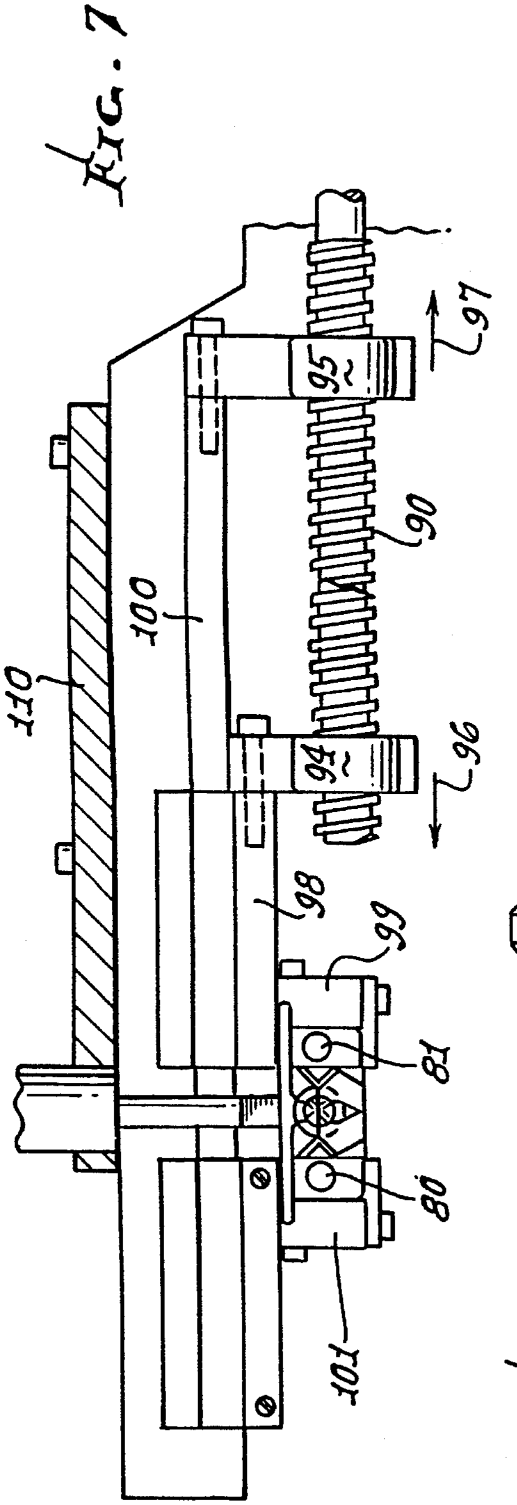
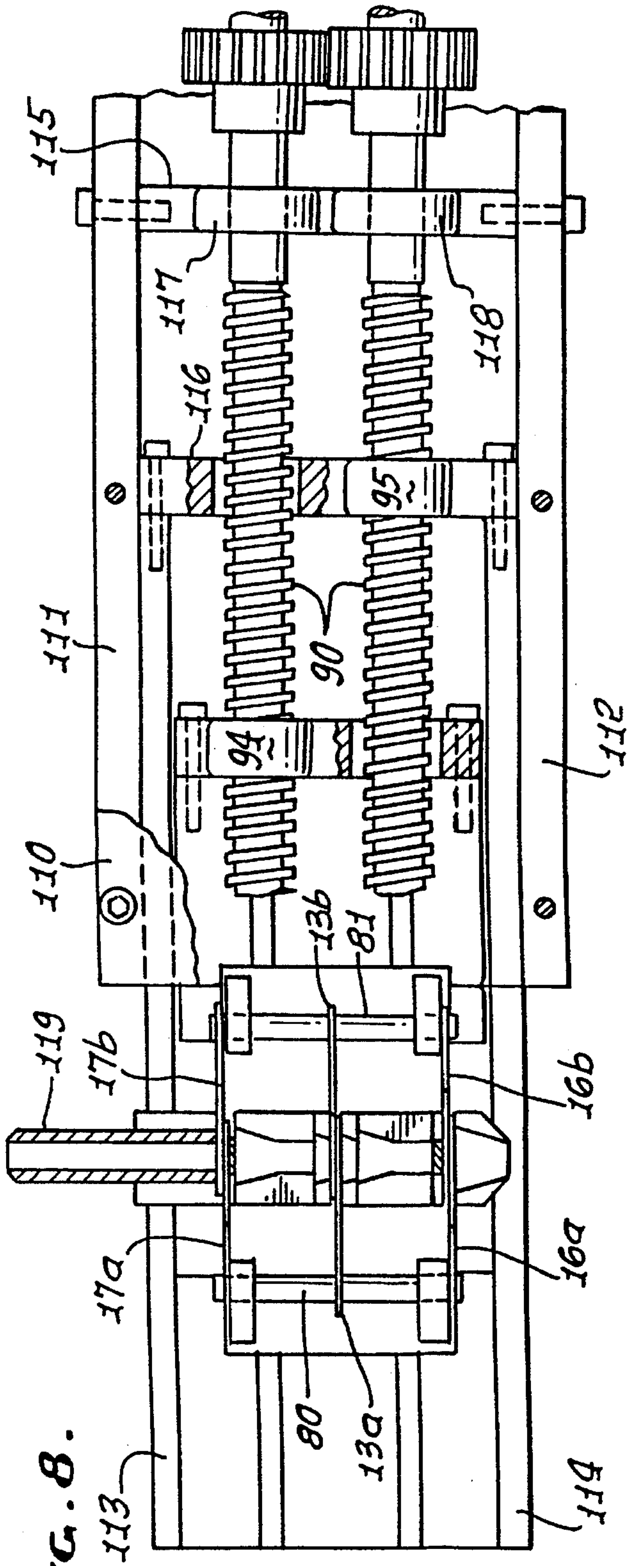
FIG. 8.

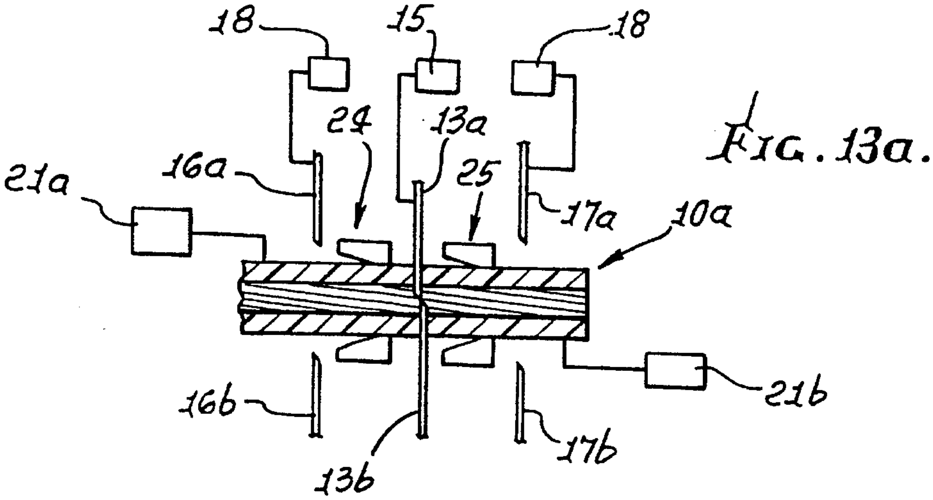
FIG. 13a.
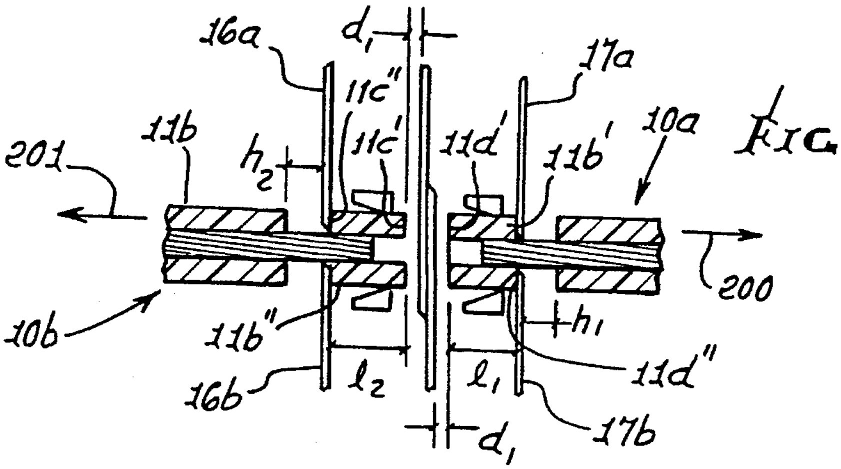
FIG. 13b.
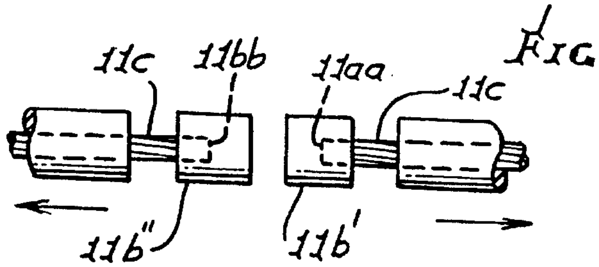
FIG. 13c.
FIG. 13d.
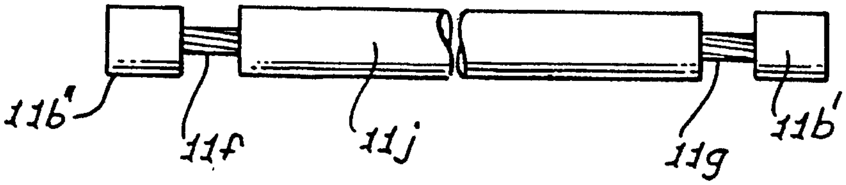

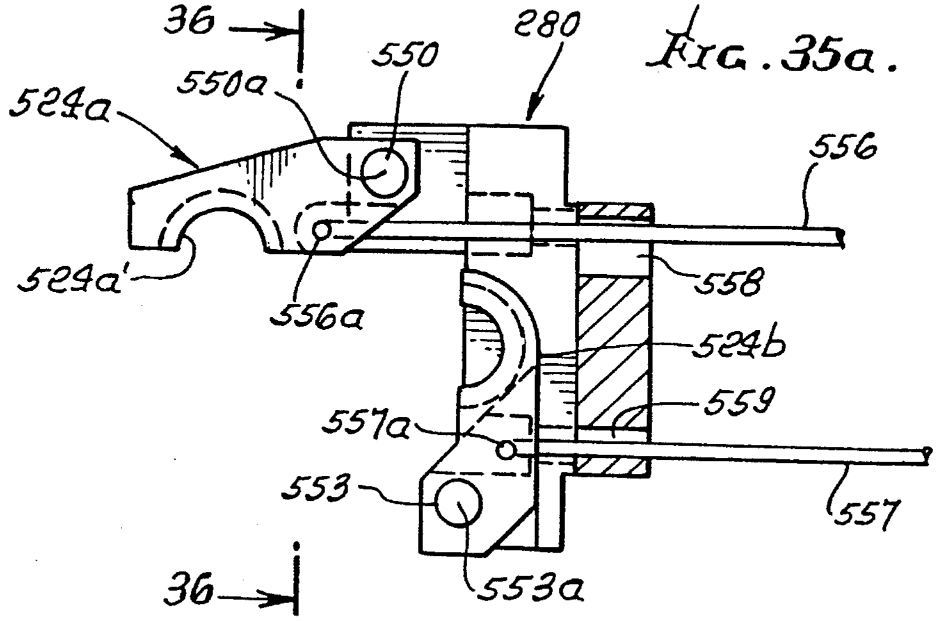
FIG. 35a.
FIG. 35b.
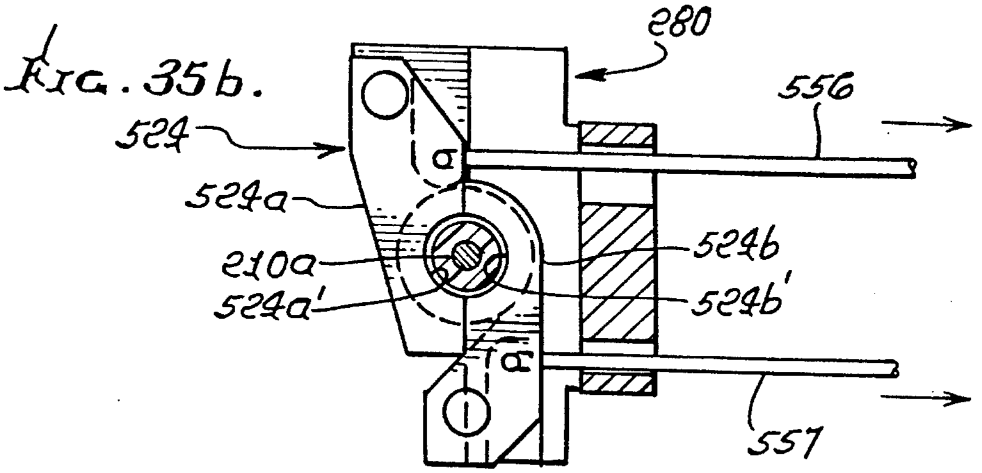
FIG. 35c.
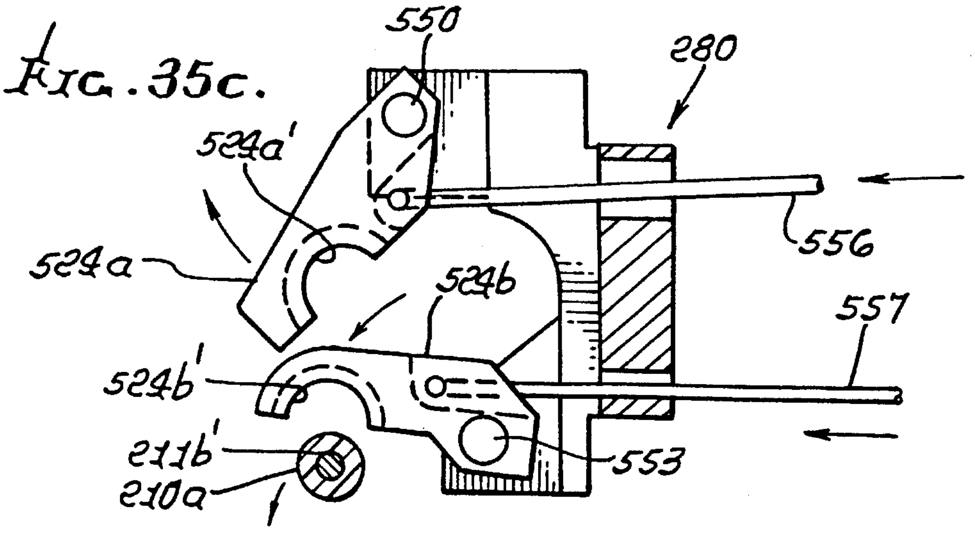

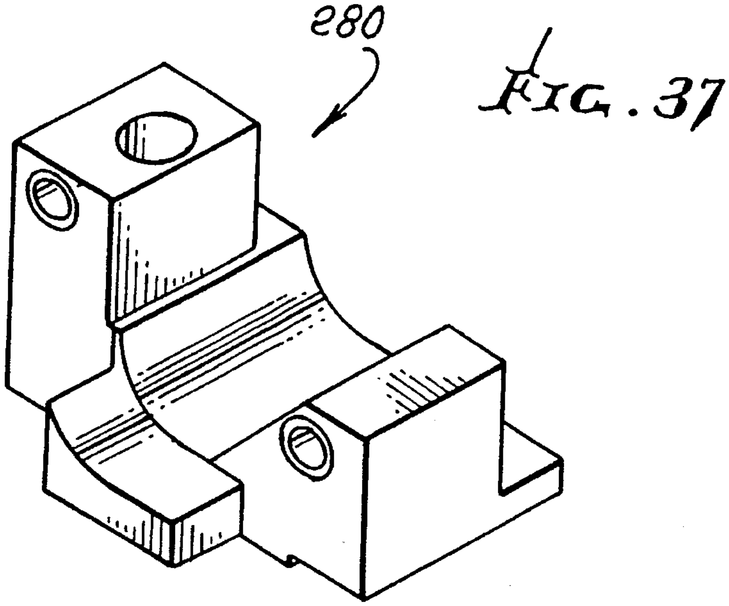
FIG. 37.
FIG. 38.
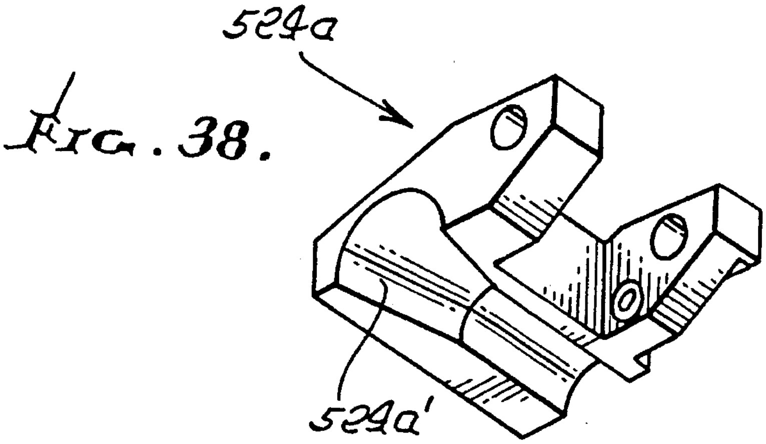
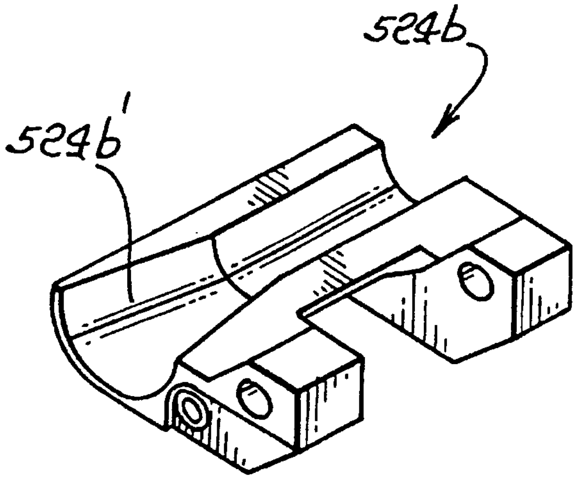
FIG. 39.

MULTIPLE BLADE SET STRIP APPARATUS FOR CABLE AND WIRE

This is a continuation of application Ser. No. 08/225,813 filed 4/11/94 U.S. Pat. No. 5,412,856; which is a continuation of Ser. No. 08/022,954 filed 2/25/93 U.S. Pat. No. 5,343,605; which is a continuation-in-part of Ser. No. 765,986 filed 9/26/91 U.S. Pat. No. 5,253,555 which is a continuation-in-part of Ser. No. 659,557 filed Feb. 22, 1991 abandoned, which is a continuation-in-part of Ser. No. 611,057 filed Nov. 9, 1990 U.S. Pat. No. 5,146,673.

BACKGROUND OF THE INVENTION

This invention relates generally to wire or cable severing, as well as stripping sheathing from severed wire sections; and more particularly, it concerns unusual advantages, method and apparatus to effect severing of a wire or cable into two sections, and stripping of sheathing off ends of both sections, with minimal motions of severing and stripping elements and in minimum time.

There is continual need for equipment capable of severing wire or cable into sections, and also capable of rapidly and efficiently stripping sheathing off ends of those sections. It is desirable that these functions be carried out as a wire or cable travels along generally the same axis, i.e., progresses forwardly, and that multiple wire and cable sections of selected length be produced, each having its opposite ends stripped of sheathing, to expose bare metal core wire at each end. Further, it is desirable that simple, radial and axial stripping adjustments be achieved upon multiple wire sections.

SUMMARY OF THE INVENTION

It is a major object of the invention to provide apparatus and method meeting the above need. The word "wire" will be used to include cable within its scope, and vice versa.

Basically, the method involves processing the wire into sections as by displacing the wire endwise along an axis to a first position; severing the wire thereby to form wire forward and rearward sections, the forward section having a rearward end portion, and the rearward section having a forward end portion; and stripping sheathing from the forward section rearward portion and from the rearward section forward portion thereby to expose wire cores at those end portions.

In this regard, the cutter means typically may include three blade pairs, each pair including two blades located at opposite sides of the axis, both blades of one pair being displaced toward the wire to sever the wire, and both blades of the remaining two pairs being displaced toward the wire sections to strip sheathing from the rearward and forward portions during controlled endwise displacement of the sections. Both blades of one pair are typically displaced into overlapping relation to sever the wire, and both blades of each of the remaining two pairs are displaced to cut only into opposite sides of the sheathing and to strip sheathing from the end portions of the sections as the sections are displaced endwise simultaneously.

Another object is to displace the two sections endwise, thereby to displace wire incorporating one of the sections to the first position. The method further includes the step of separating the sections axially relatively endwise after the step of severing of the wire and prior to the step of stripping of sheathing from the section end portions. In addition, the method may include the step of further separating the sections axially relatively endwise after the blades of the remaining two pairs have been displaced toward the wire sections to cut into the sheathing, thereby to pull sheathing slugs off the wire end portions to expose the wire end cores.

Yet another object is to guide displacement of the wire endwise along the axis, at locations between blade pairs; and in this regard, both of the forward and rearward sections may be so guided.

A further object is to carry out separation of the forward and rearward wire sections by advancing one section and retracting the other section, relative to the one blade pair; and the method typically involves carrying out further separation of the sections by further advancing the one section and further retracting the other section, relative to each one blade pair.

Apparatus for processing wire into sections, as referred to, and to strip sheathing from the sections to expose wire core ends, basically includes:

a) conveyor means for displacing the wire, including the sections, axially endwise, b) first cutter means including multiple blades located for movement toward the axis, and a first drive means for controllably displacing the multiple cutter blades toward the axis to sever the wire, c) second and third cutter means each including multiple blades located for movement toward the axis, and additional drive means for controllably displacing the multiple blades of the second and third cutter means toward the axis to cut into the sheathing, the second and third cutter means respectively located at axially opposite sides of the first cutter means and axially spaced therefrom, d) and drive means to controllably drive the conveyor means to i) position the wire to be severed by the first cutter means, thereby to produce forward and rearward wire sections, ii) relatively displace the sections axially, into positions to enable penetration of the second and third cutter means blades into the sheathing, for subsequent stripping of sheathing from a rearward portion of the forward section and from a forward portion of the rearward section, as during or in association with controlled endwise displacement of the sections by the conveyor means.

Forward and rearward pairs of endless conveyors are typically employed, each pair of conveyors defining a wire gripping zone, such zones maintained in alignment with the wire sections during separation of the latter. Means is further provided to maintain one conveyor of each pair laterally displaced relatively toward the other conveyor of the pair to clamp the wire sections between the conveyors of the pairs during the further separation of the wire sections, and operating the conveyor pairs in endless relation to effect the relative separation in a longitudinal direction.

As will also be seen, the blades of the first cutter means typically have positions of relative overlap to sever the wire, in response to operation of the first drive means; and the blades of the second and third cutter means typically have positions of penetration only into the sheathing of the section end portions and to such depths as to enable stripping of the sheathing end portions in response to the controllable driving of the conveyor means.

A further object is to provide a method of processing wire to cut the wire into sections and to remove sheathing from the wire to expose wire ends at opposite ends of the sections, and by operation of wire feed means and cutter means, the steps of the method including operating the feed means and cutter means to:

a) displace the wire endwise along an axis to a first position, b) sever the wire thereby to form wire forward and rearward sections, the forward section having a rearward end portion, and the rearward section having a forward end portion, and c) remove sheathing from the forward section rearward portion and from the rearward section forward portion thereby to expose wire ends, d) the cutter means including three blade pairs, each pair including two blades located at opposite sides of the axis, both blades of one pair being displaced toward the wire to sever the wire, and including the step of controllably displacing both blades of the remaining two pairs toward the wire sections to controlled depths thereby to remove sheathing from the rearward and forward portions in association with controlled endwise displacement of the sections, e) the sections being controllably endwise displaced to control the lengthwise dimensions of the removed sheathing.

Alternative steps to d) and e) include the use of drive means to controllably drive the conveyor means to relatively displace the sections axially, into positions to enable penetration of the blades of the remaining two pairs into the sheathing, for subsequent displacement of sheathing slugs along a rearward portion of the forward section and along a forward portion of the rearward section, in association with controlled endwise displacement of the sections by the conveyor means, the sections being controllably endwise displaced to control the lengthwise displacement of the slugs along the wire for protecting wire ends.

In the above, the wire end or ends protected by the sheathing slugs, as against fraying, may comprise multiple clustered strands having multiple ends protectively surrounded by the displaced slugs. Also, the method may include displacing only one slug along its wire section to protect the associated metallic cut end of the stranded wire.

In addition, novel and unusually effective apparatus is provided to advance the three sets of blades simultaneously toward the wire to first sever, and subsequently strip or remove wire sheathing, at multiple axial locations, wire sections being axially displaced while severing blades are closed, and prior to closure of sheath stripping blades toward the sections. Pushing or ejecting of severed insulation slugs is also provided for.

Additional objects include the provision of means for supporting the blades in a blade holder in such manner as to permit ease of blade removal and replacement; magnetic means to initially hold the blades in the blade holder prior to their being clamped in position, thereby preventing inadvertent drop-out of the multiple blades as they are being installed; means for releasably locking the blades in installed and clamped condition; the integration of wire guide means with severed slug trap door means and ejector means; the provision for simple, timed actuation of the slug trap door means and injector means; and the provision of wire position sensing means, to sense arrival of the wire at the blade region, which is very important when extremely small diameter wire is being procured, the position of such wire rearwardly being difficult to ascertain.

These and other objects and advantages of the invention, as well as the details of an illustrative embodiment, will be more fully understood from the following specification and drawings, in which:

DRAWING DESCRIPTION

FIGS. 1*a*–1*f* are diagrammatic views showing steps in the method of wire or cable processing;

FIG. 7 is a view like FIG. 6 but showing the blades in advanced positions;

FIG. 8 is a plan view of the FIG. 6 and FIG. 7 mechanism;

Figure 1A:
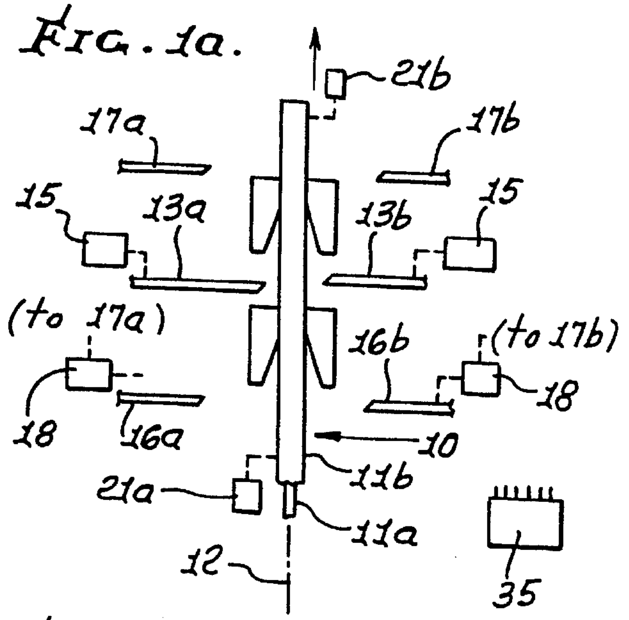
Figure 1D:
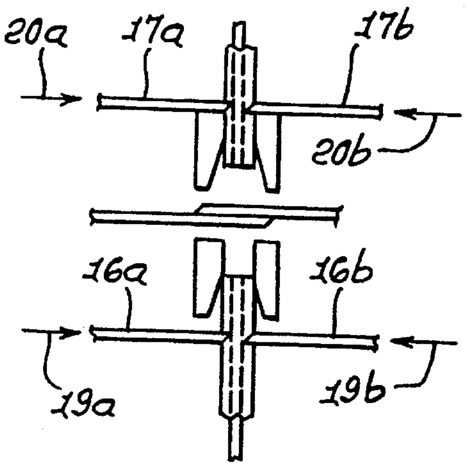
Figure 1B:
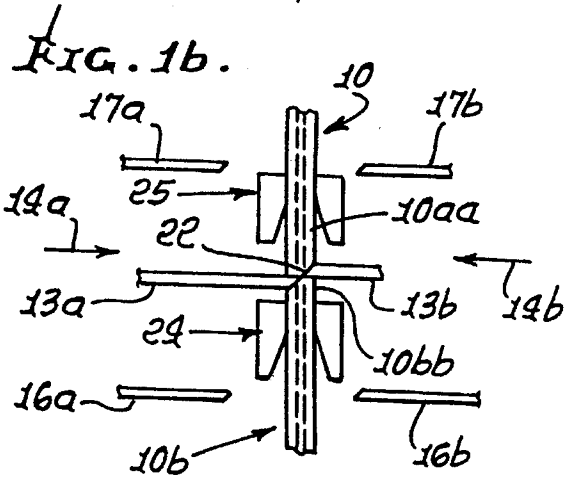
Figure 1E:
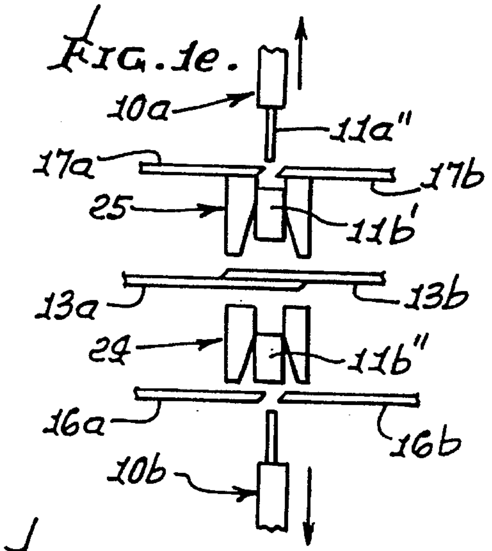
Figure 1C:
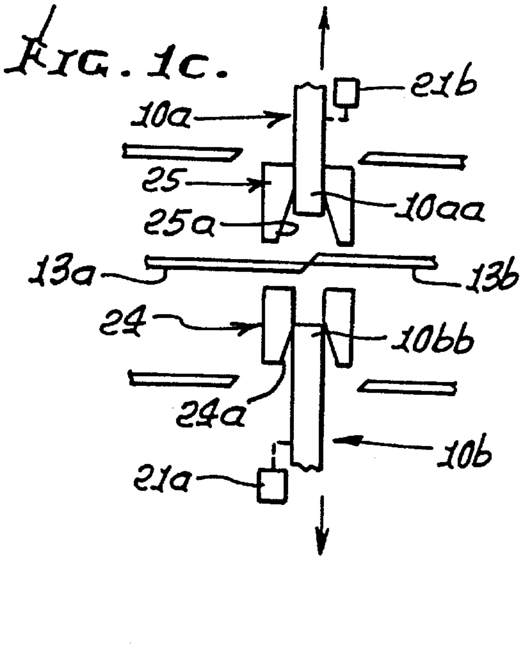
Figure 1F:
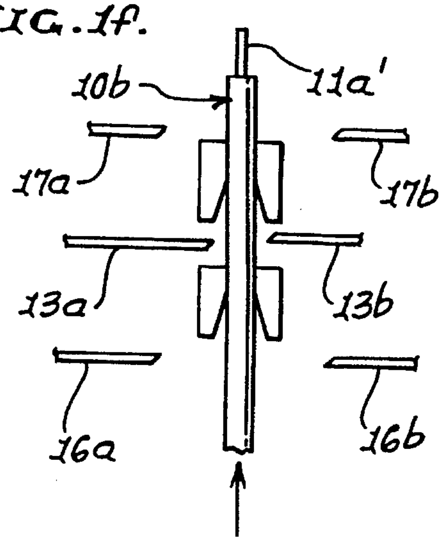
Figure 9:
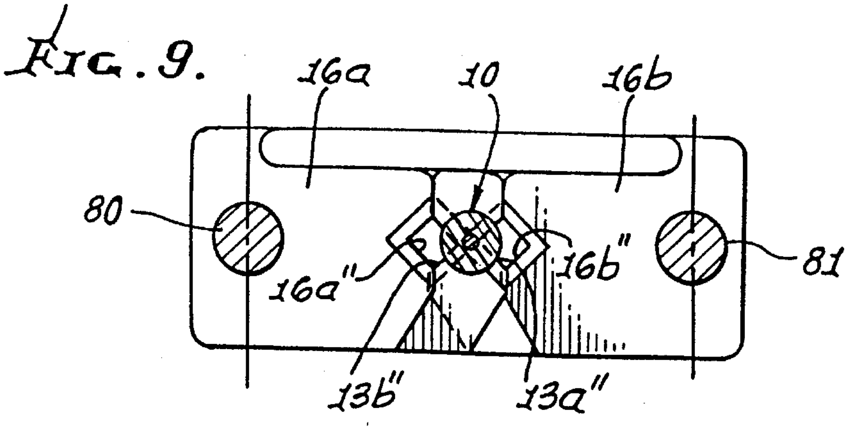
FIG. 9 is an end view showing wire severing blades in wire severing position, as in FIG. 1*b;*
Figure 10:
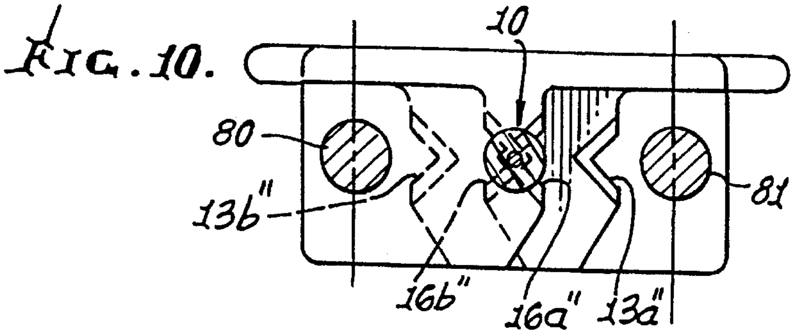
FIG. 10 is an end view like FIG. 9 showing the sheathing stripping blades, in sheathing stripping position, as per FIG. 1*d;*
Figure 10A:
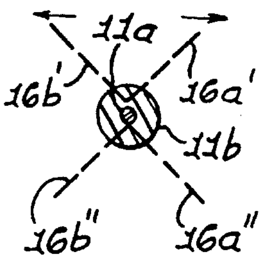
Figure 11:
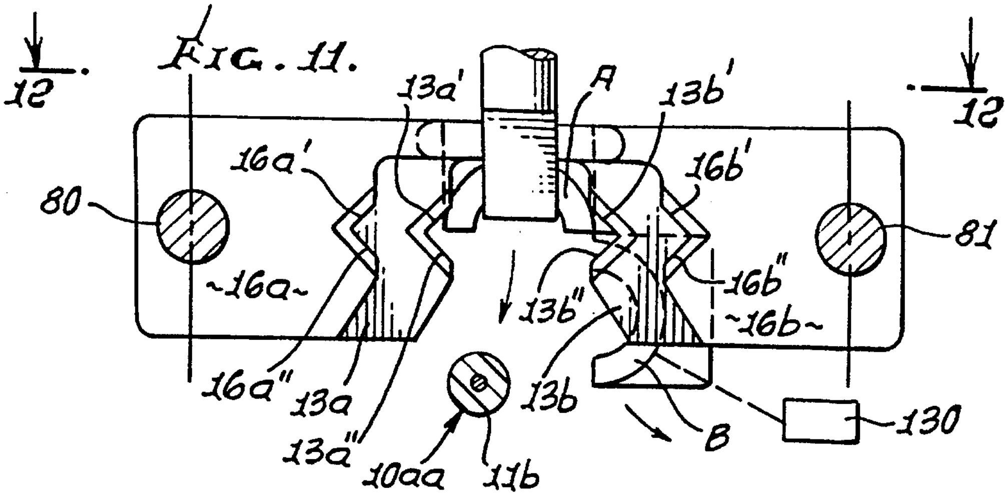

FIG. 10*a* is a view showing stripping blade edge penetration into wire sheathing;

FIG. 11 is a view like FIGS. 9 and 10, but showing all blades in retracted position, as in FIGS. 1*a* and 1*f;*

Figure 2:
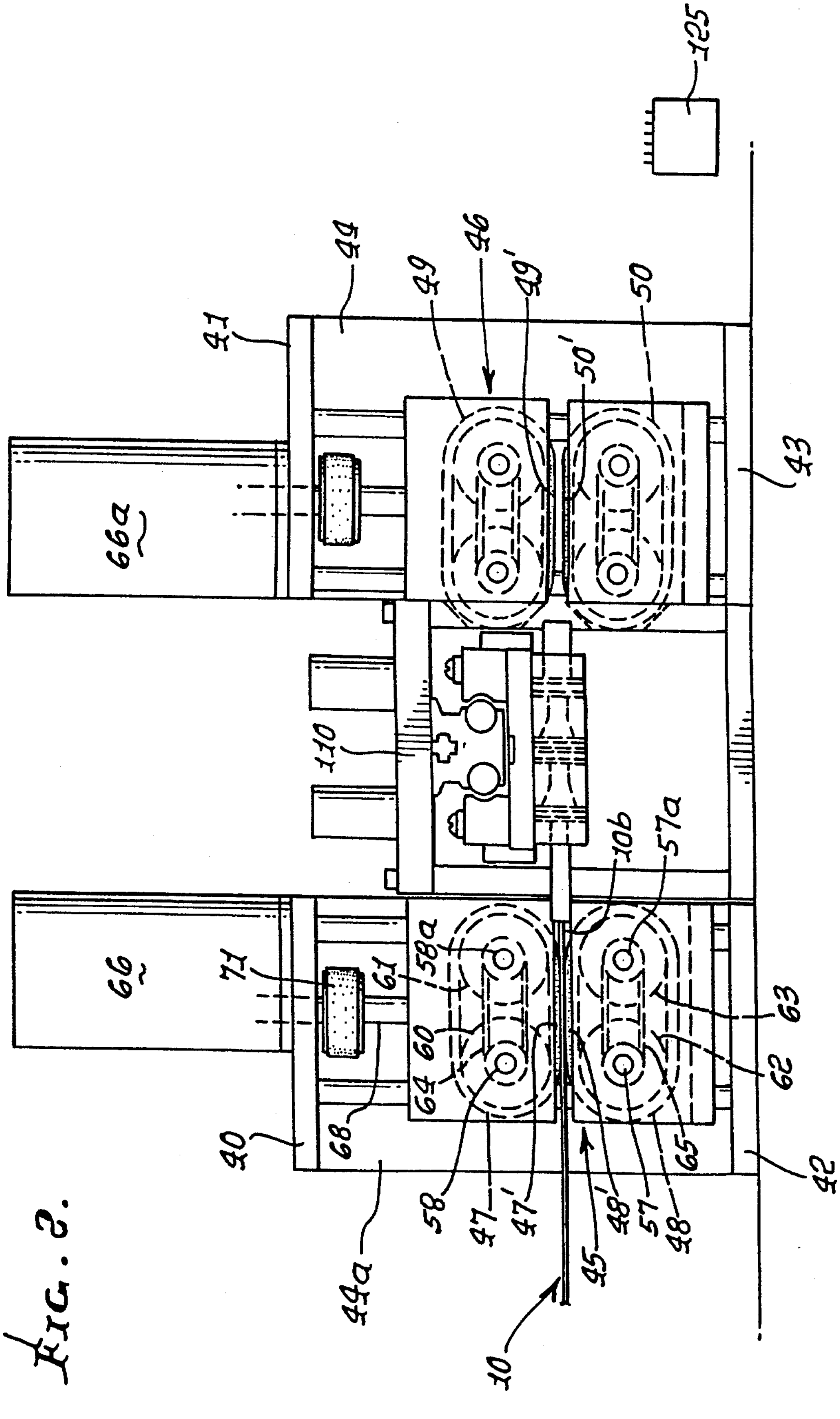
FIG. 2 is a side view elevation showing wire displacing and processing apparatus.
Figure 12:
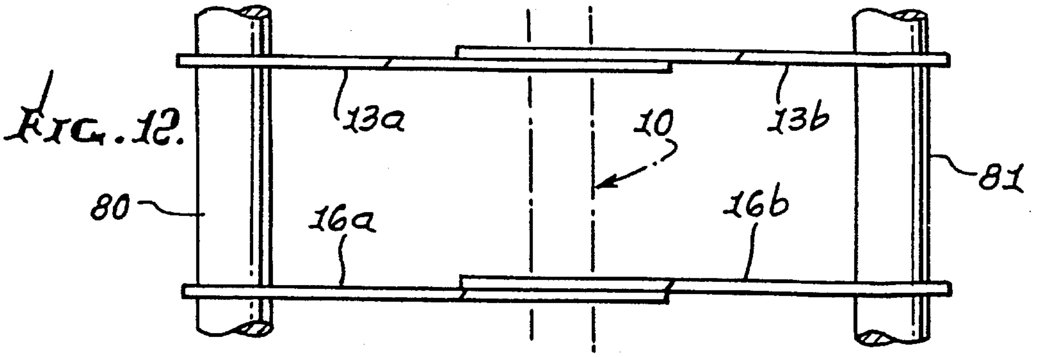
Figure 14:
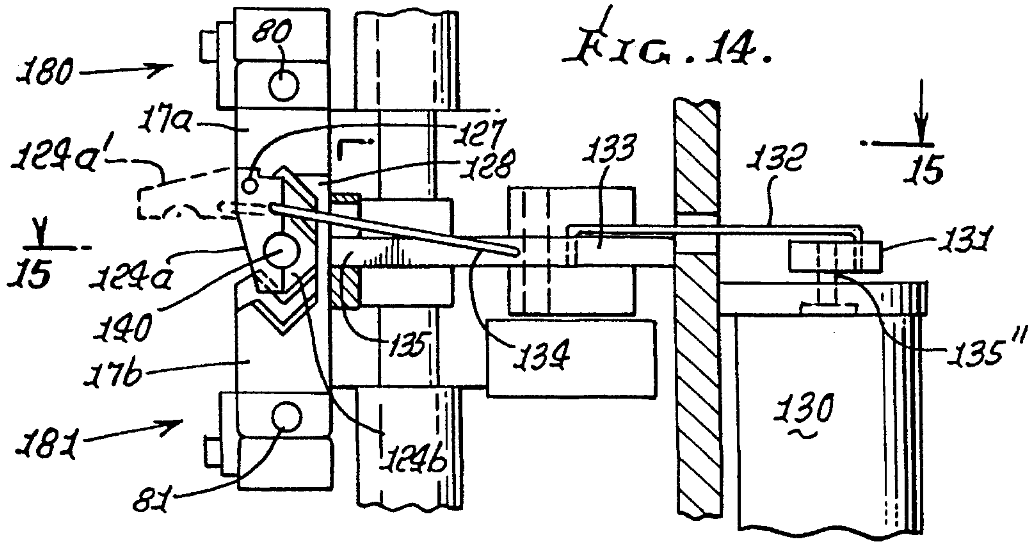
Figure 15:
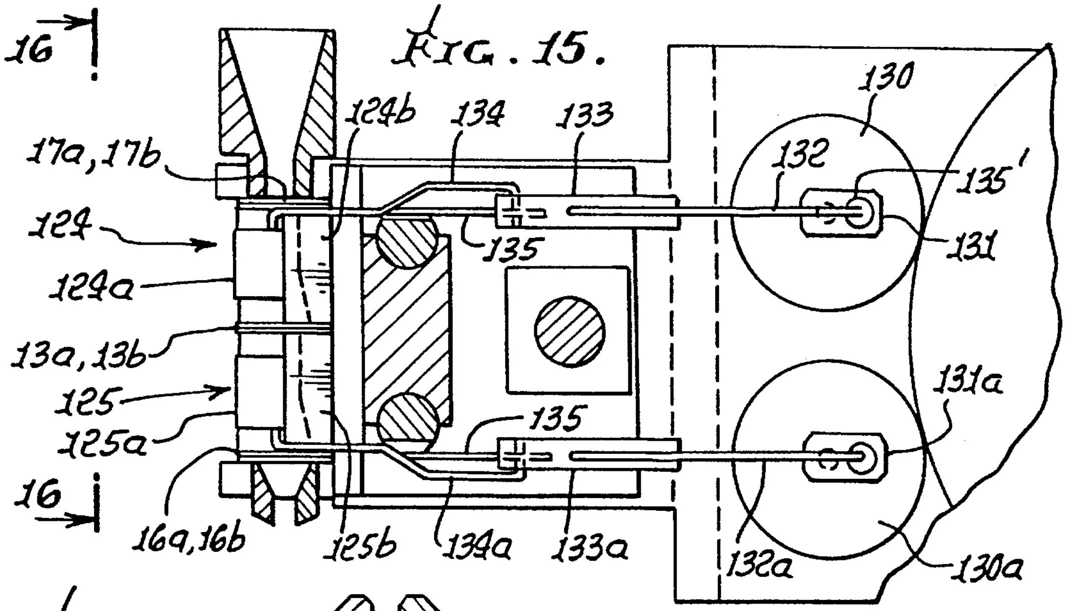
Figure 16:
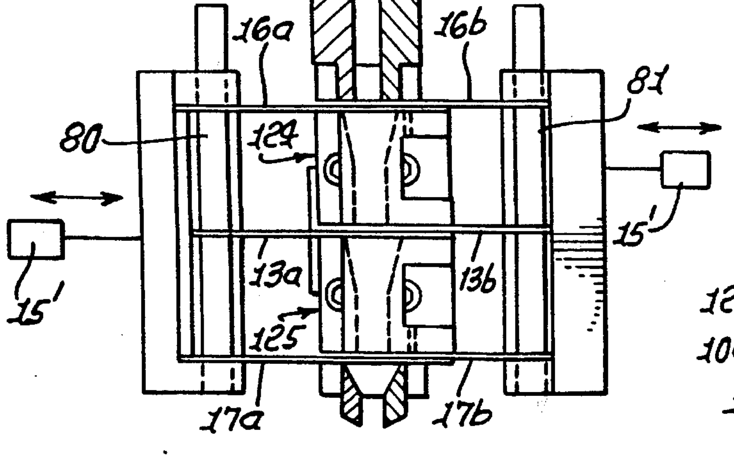
Figure 17:
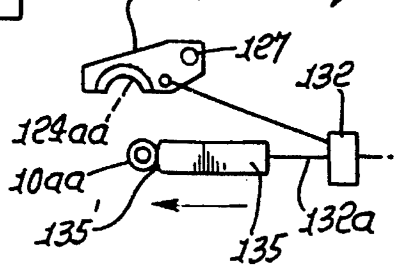
Figure 19:
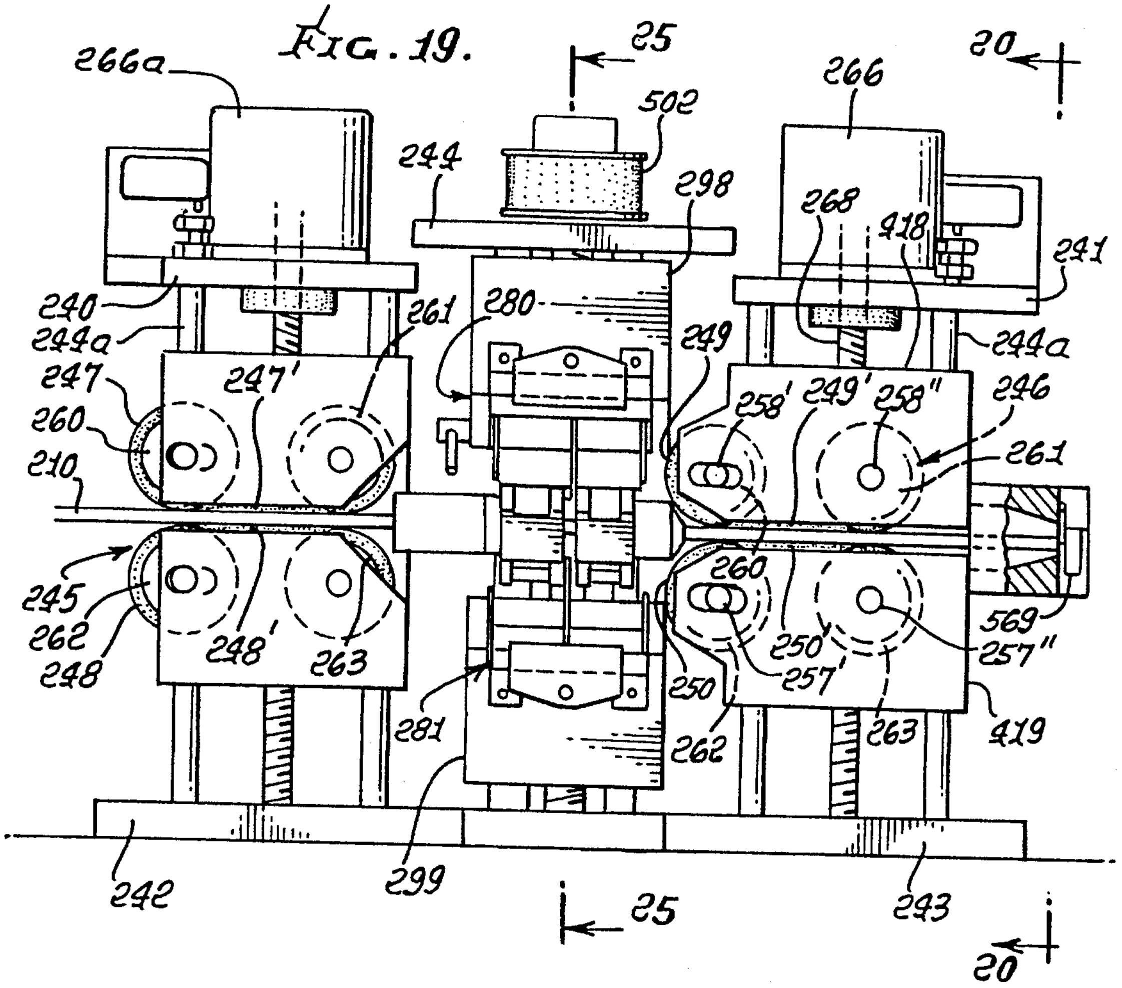
Figure 23:
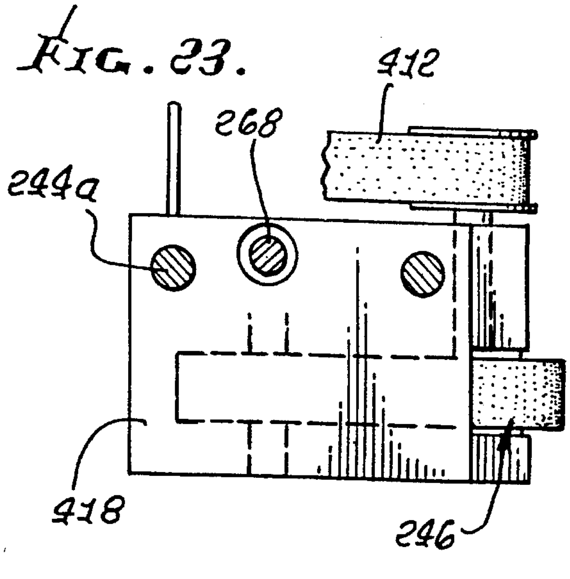
Figure 24:
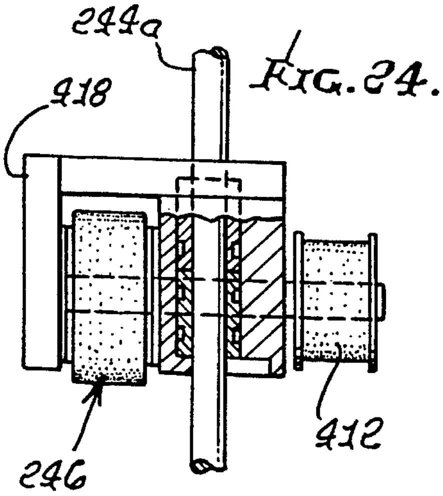
Figure 20:
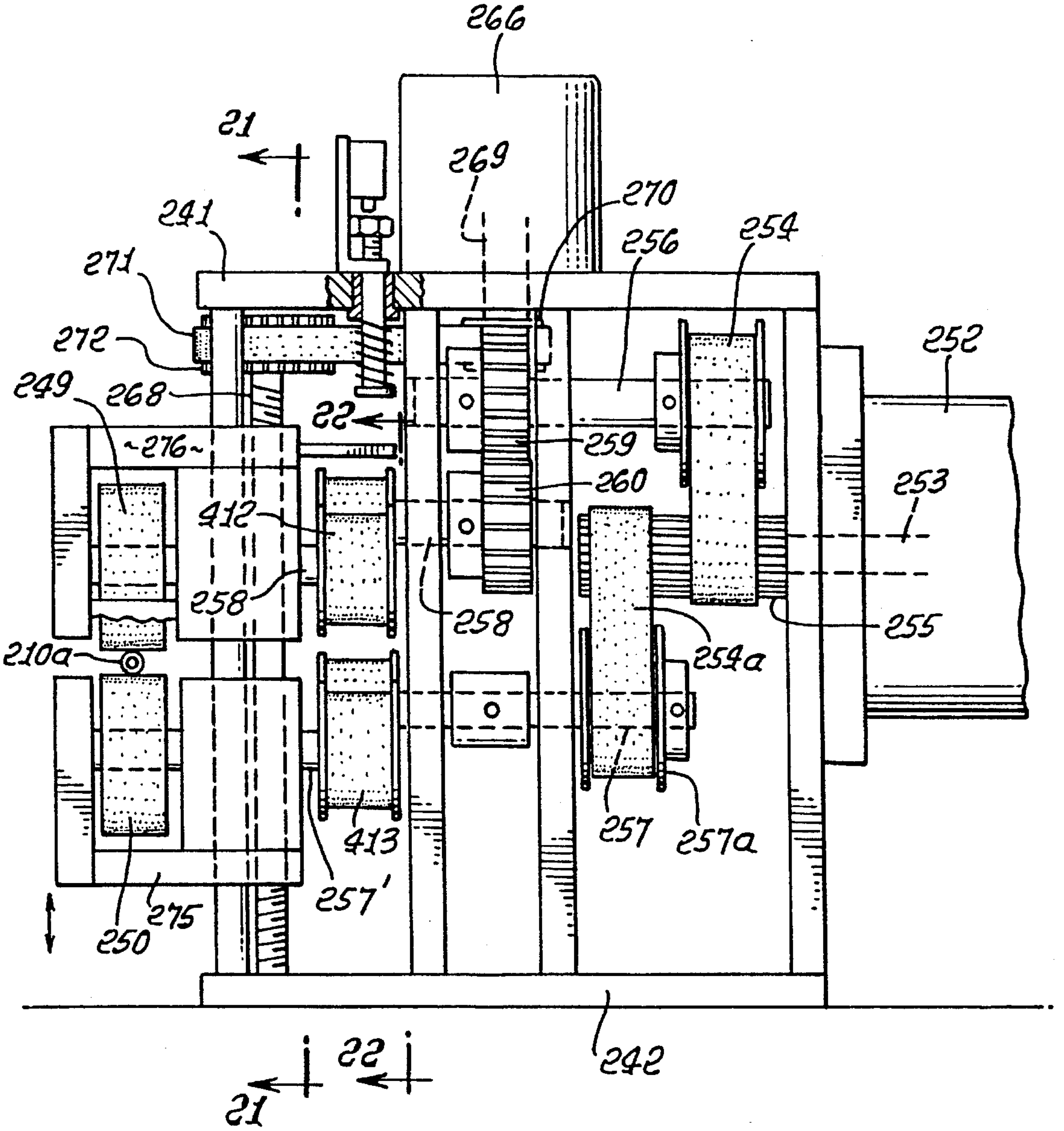
Figure 22:
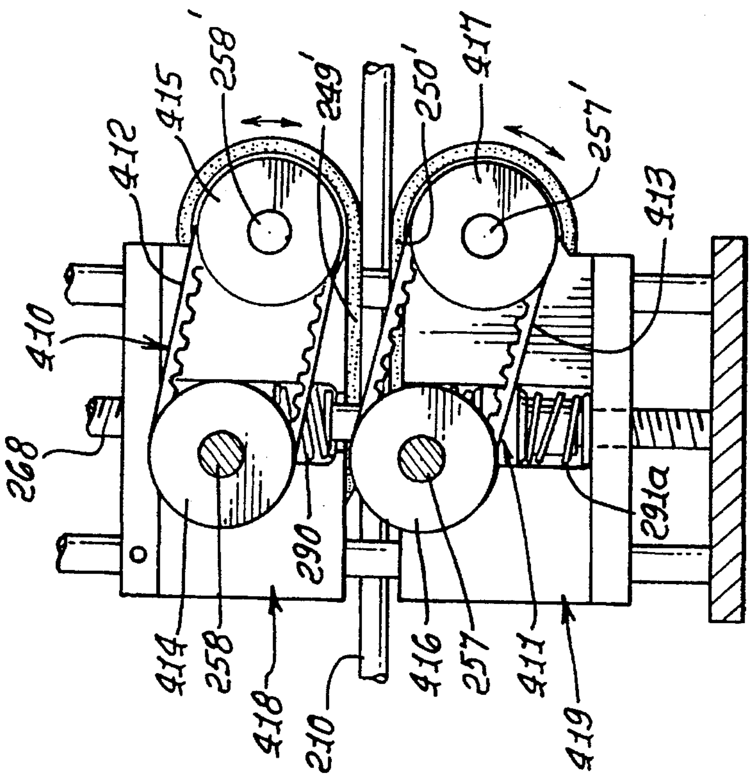
Figure 21:
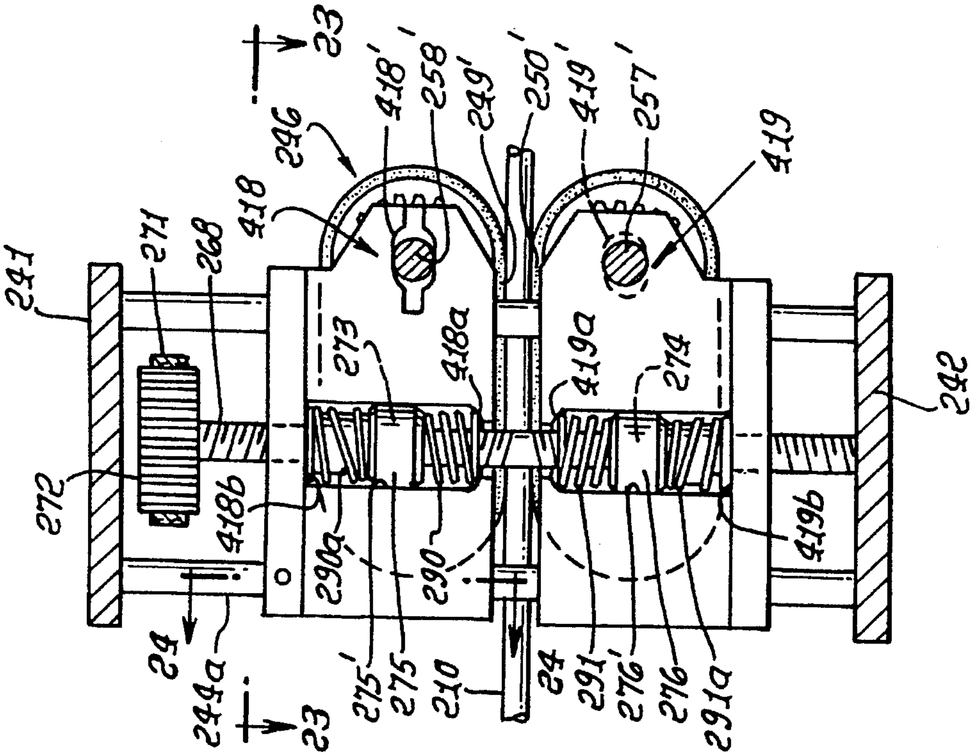
Figure 25:
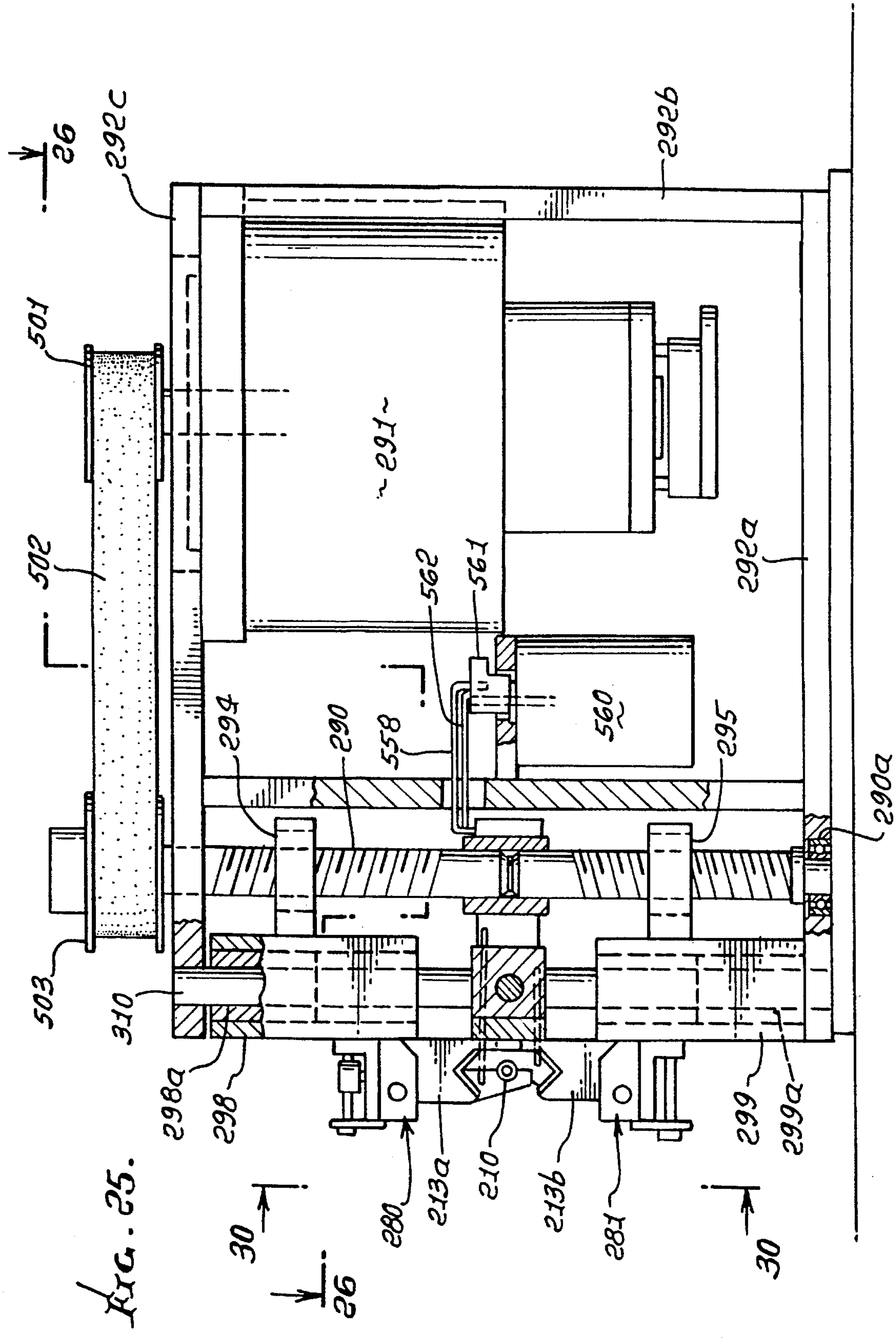
Figure 26:
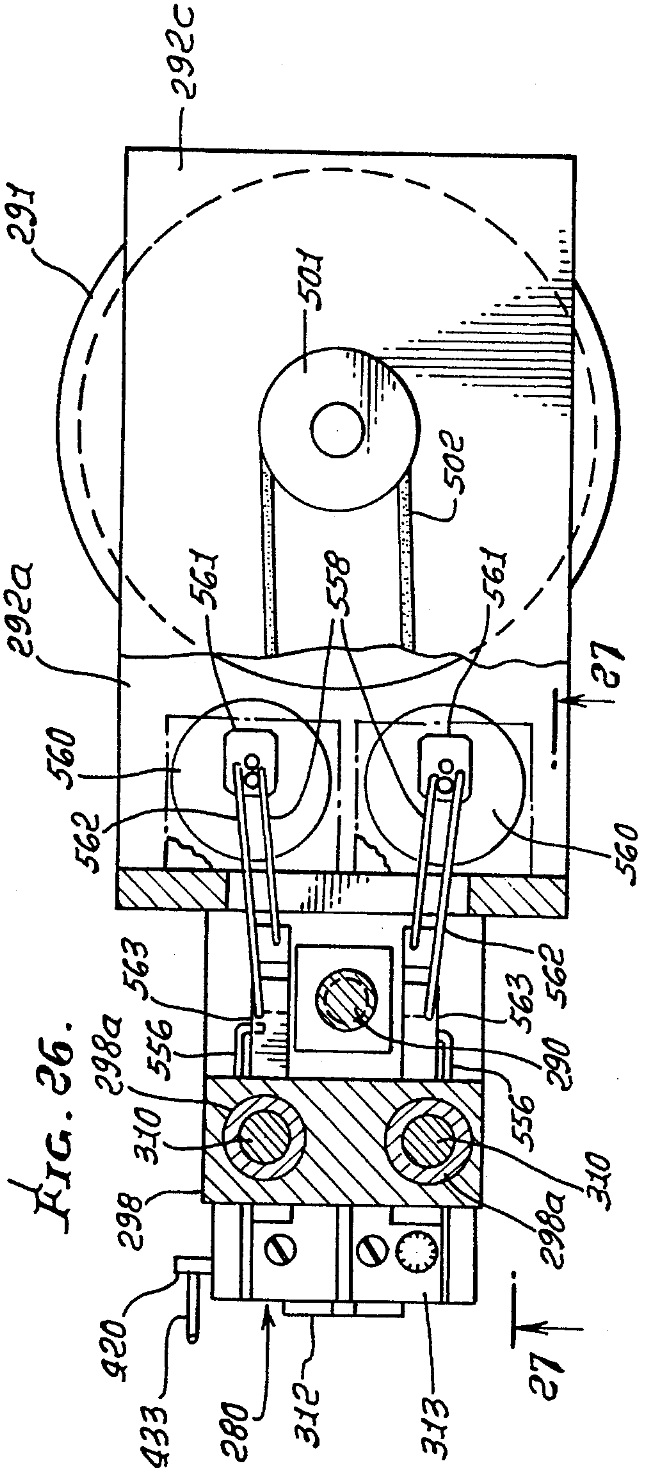
Figure 27:
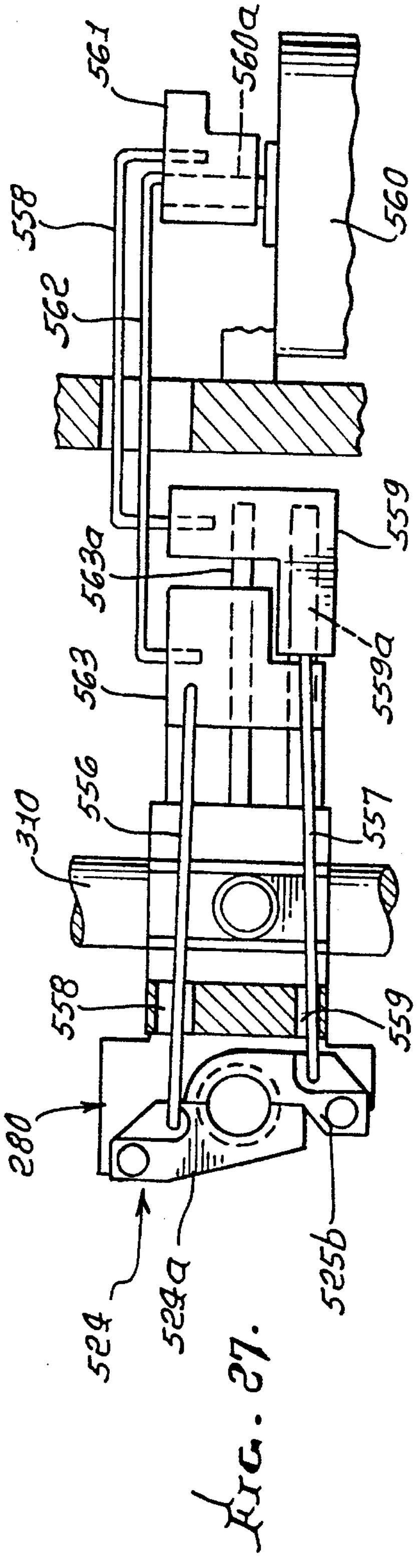
Figure 28:
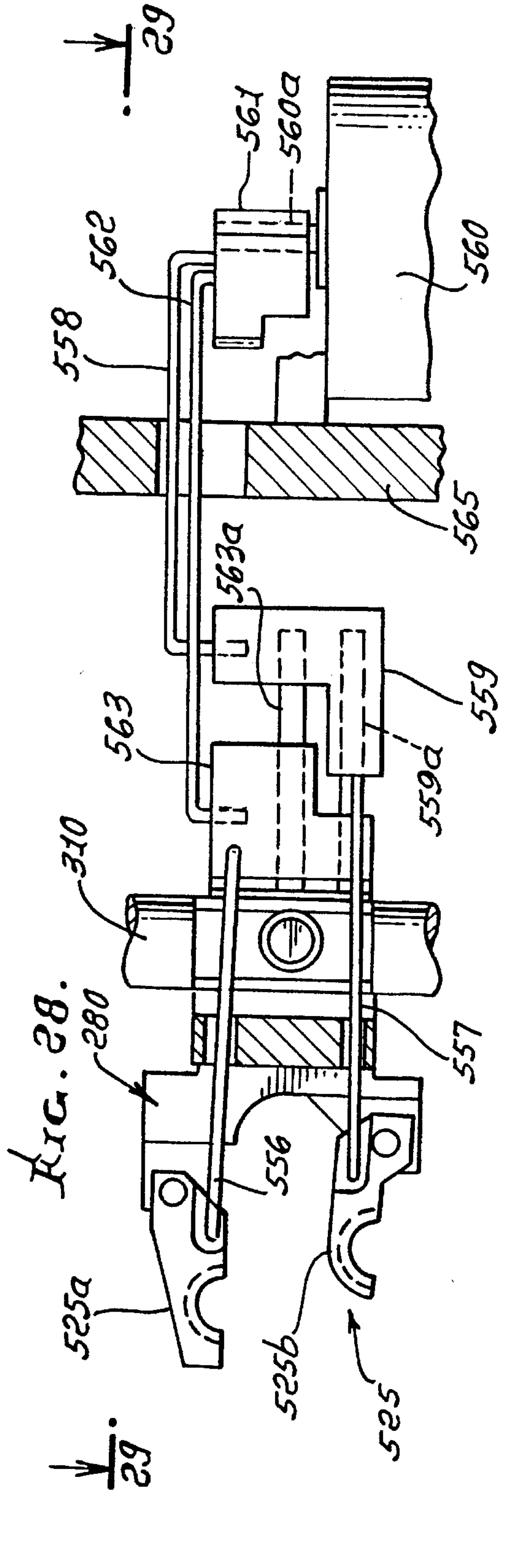
Figure 29:
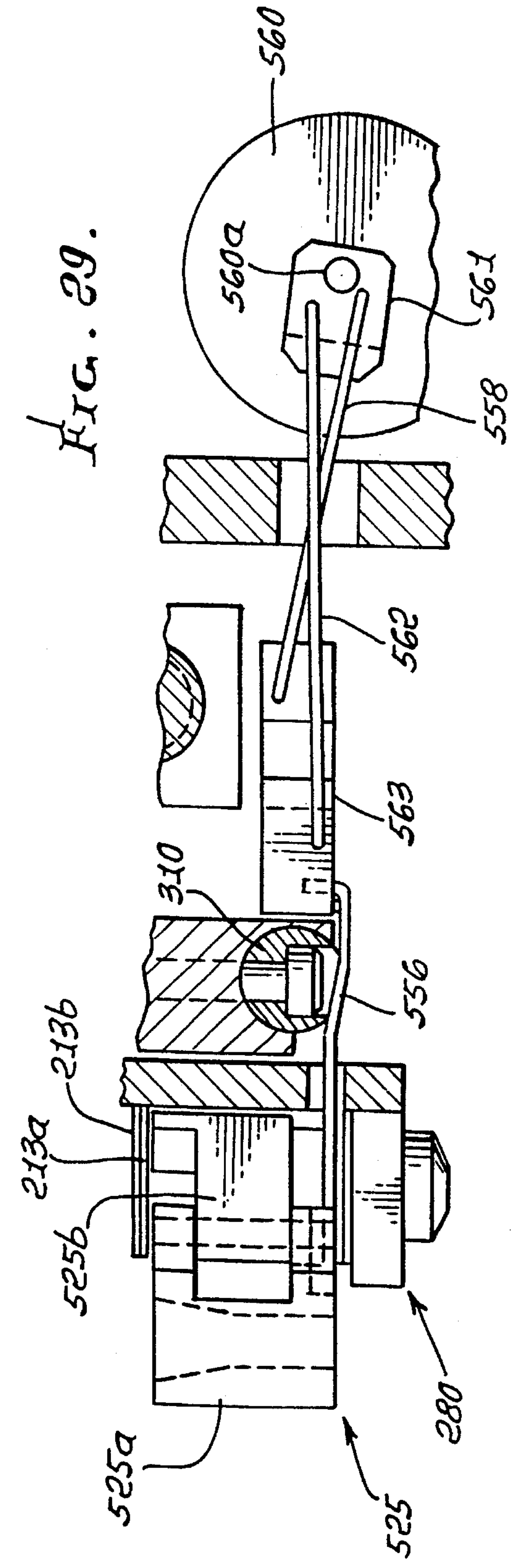
Figure 30:
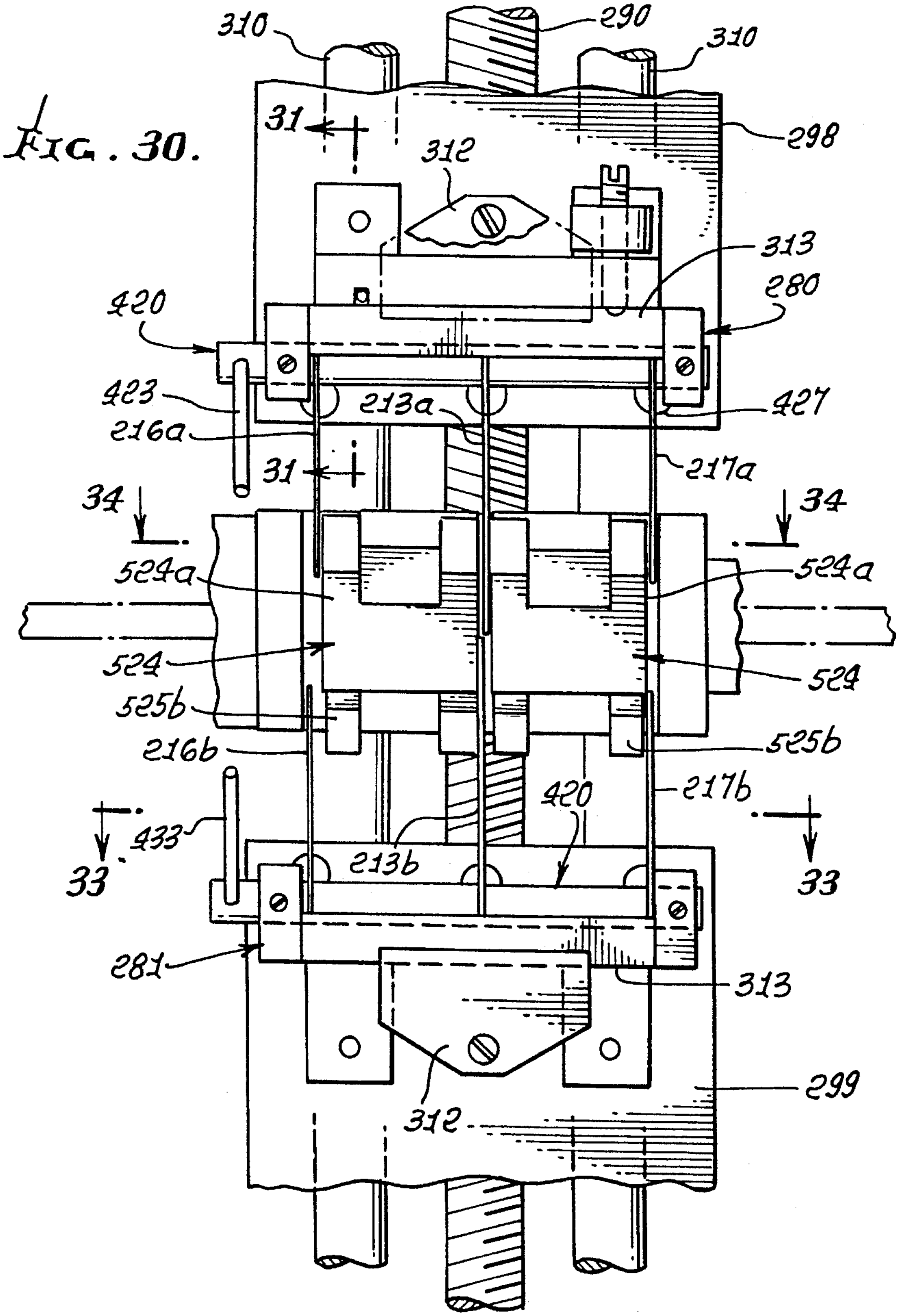
Figure 31:
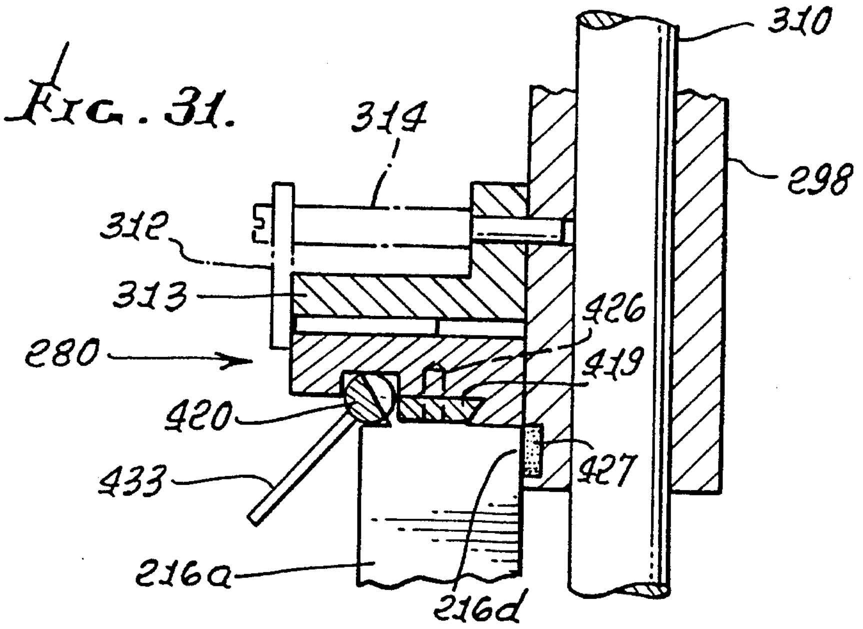
Figure 32:
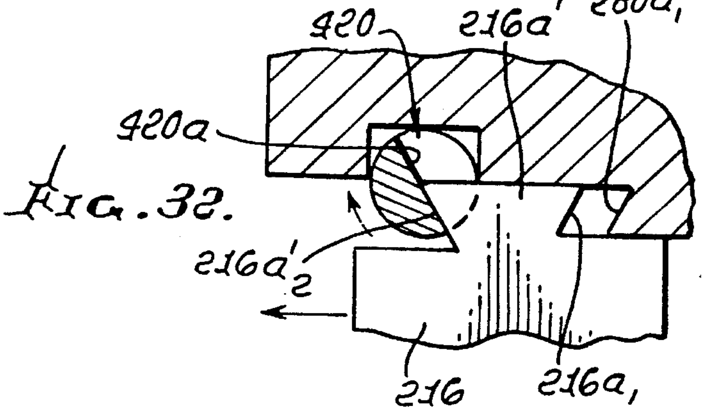
Figure 33:
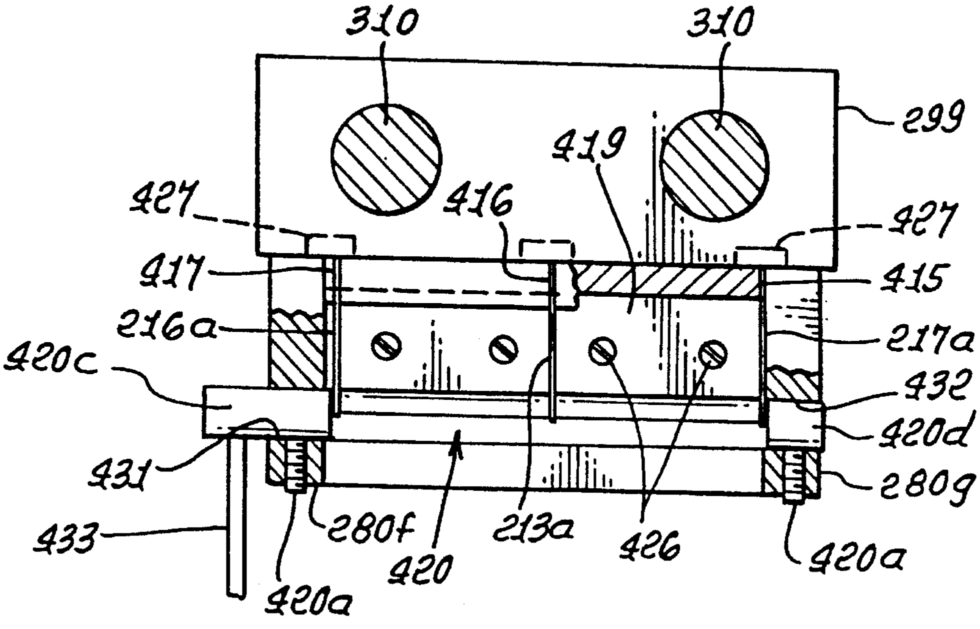
Figure 34:
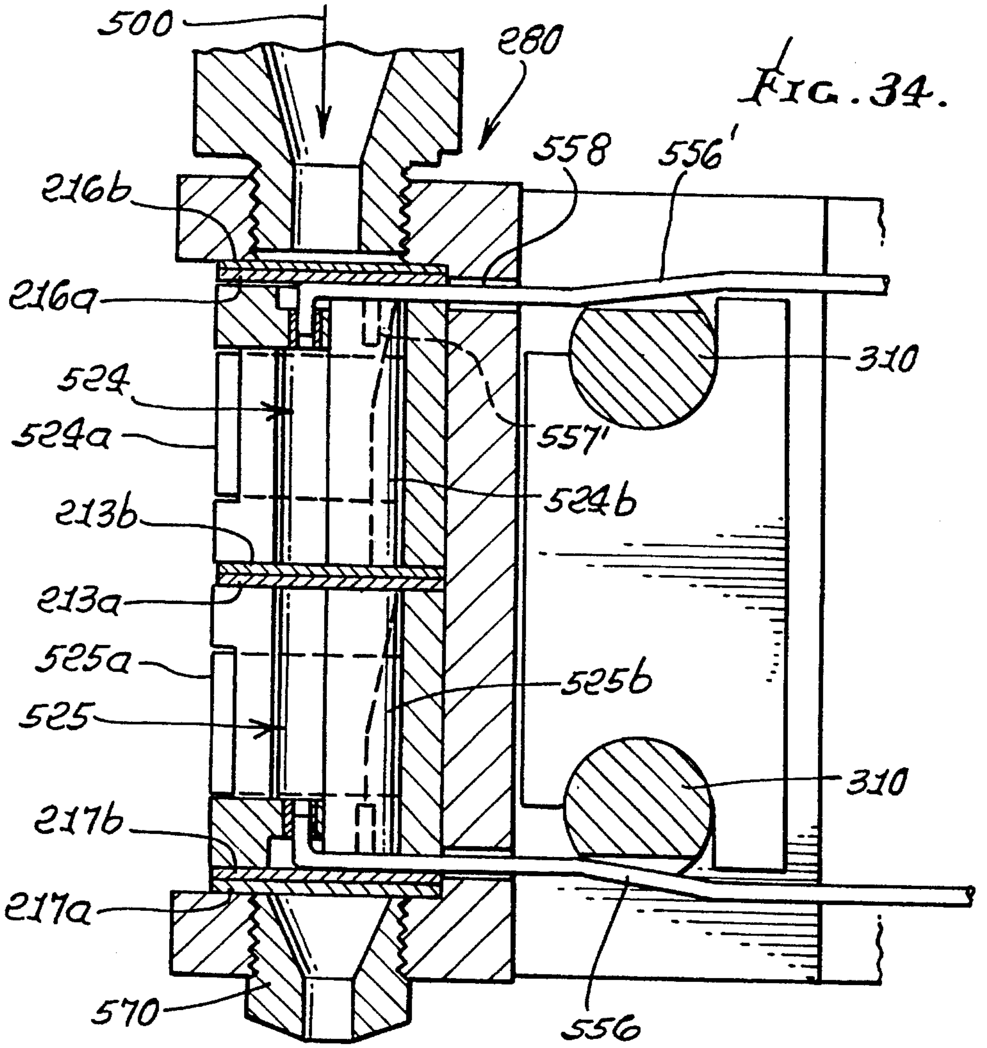
Figure 36:
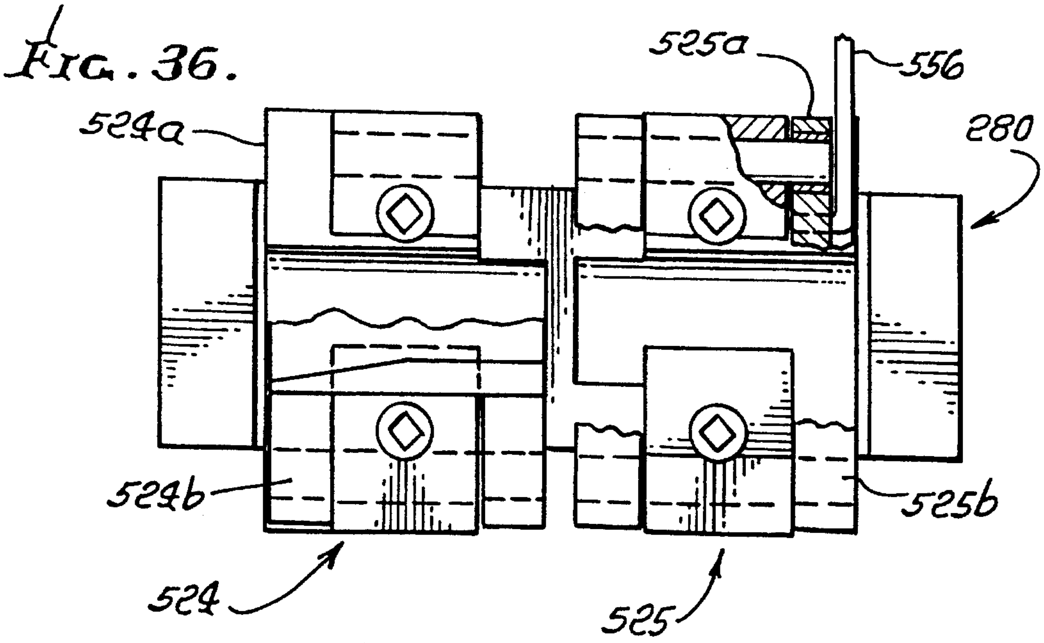
Figure 41:
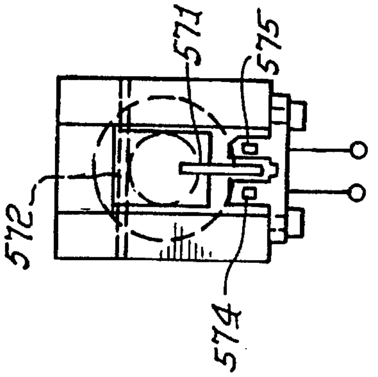
Figure 40:
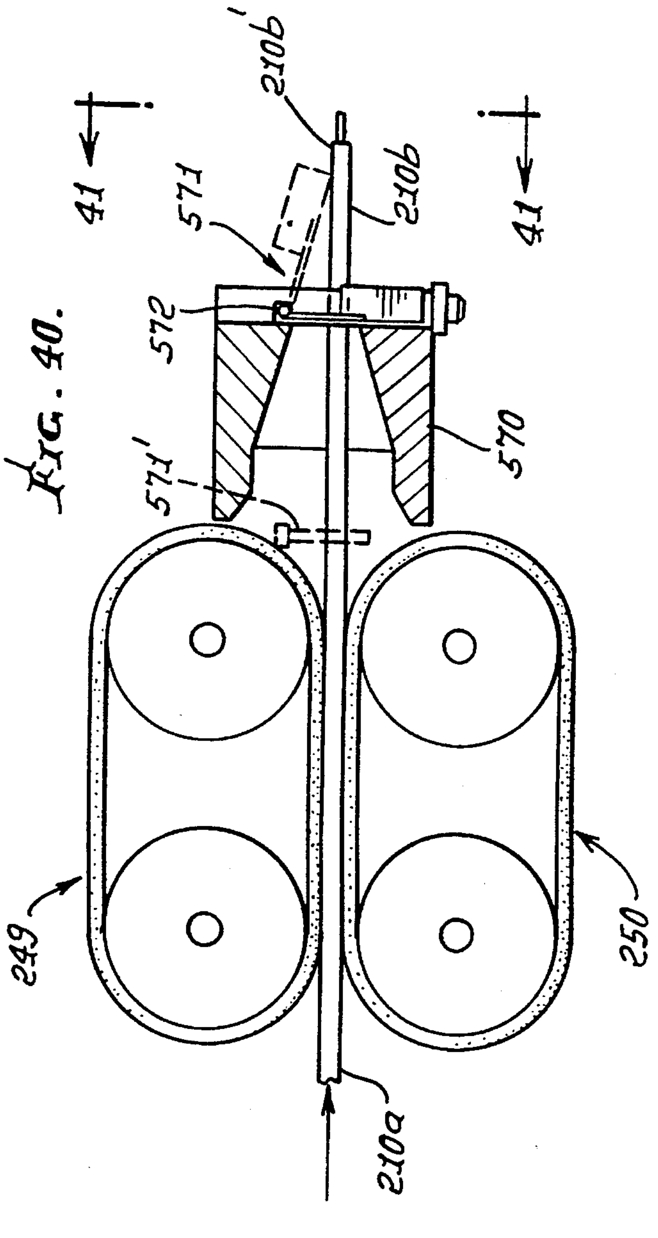

FIG. 12 is an end view taken on lines 12—12 of FIG. 11;

FIGS. 13*a*–13*d* are diagrammatic views showing additional steps in the method of wire or cable processing;

FIG. 14 is a side elevation showing cut insulation slug release and ejection means;

FIG. 15 is a plan view on lines 15—15 of FIG. 14;

FIG. 16 is an end elevation taken on lines 16—16 of FIG. 15;

FIG. 17 is a schematic showing of slug pusher operation;

FIGS. 18*a*–18*f* are perspective views showing steps in the method of wire processing;

FIG. 19 is a side elevational view like that of FIG. 2 showing wire conveying and processing apparatus;

FIG. 20 is an end view taken on lines 20—20 of FIG. 19;

FIG. 21 is a section taken in elevation on lines 21—21 of FIG. 20;

FIG. 22 is a section taken in elevation on lines 22—22 of FIG. 20;

FIG. 23 is a section taken on lines 23—23 of FIG. 21;

FIG. 24 is a section taken on lines 24—24 of FIG. 21;

FIG. 25 is a vertical section taken on lines 25—25 of FIG. 19;

FIG. 26 is a plan view, partly in section, taken on lines 26—26 of FIG. 25;

FIG. 27 is an elevation taken on lines 27—27 of FIG. 26;

FIG. 28 is an enlarged plan view, like that of FIG. 26, showing wire slug trap door and pusher elements in outwardly pivoted states;

FIG. 29 is an elevation taken on lines 29—29 of FIG. 28;

FIG. 30 is an enlarged frontal elevation taken on lines 30—30 of FIG. 25;

FIG. 31 is an enlarged vertical section taken on lines 31—31 of FIG. 30 showing blade retention means;

FIG. 32 is a further enlarged section showing a portion of FIG. 31, with a blade retention means in released position;

FIG. 33 is a horizontal plan view taken in section on lines 33—33 of FIG. 30;

FIG. 34 is a horizontal plan view taken in section on lines 34—34 of FIG. 30;

FIGS. 35a–35c are enlarged views showing actuation of wire slug trap door and pusher elements;

FIG. 36 is a section taken on lines 36—36 of FIG. 35a;

FIG. 37 is a perspective view of a wire guide element;

FIG. 38 is a perspective view of a wire slug trap door element;

FIG. 39 is a perspective view of a wire slug pusher door element;

FIG. 40 is a side elevational view of a wire advancement detection means;

FIG. 41 is an end view taken on lines 41—41 of FIG. 40; and

Figure 42:
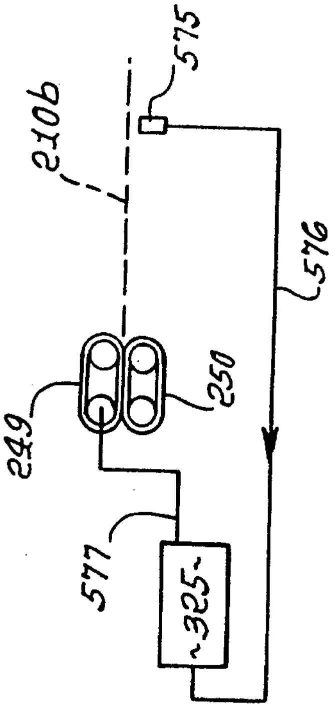

FIG. 42 is a circuit diagram.

DETAILED DESCRIPTION

Referring first to FIGS. 1a–1f, they show in diagrammatic form the positions of both wire severing and sheathing stripping blades, during various steps in the wire processing procedure or method. In this regard, the "wire" 10 (meant to also refer to cable) has a metal core 11a and a tubular sheathing 11b about the core. The wire is shown extending axially longitudinally in FIGS. 1a–1f, the axis being located at 12.

First cutter means is provided to include, or may be considered to include, multiple blades. See for example the two wire-cutting blades 13a and 13b of a first set, located or carried for movement laterally toward and away from the wire axis 12. A first drive for controllably simultaneously enabling or advancing the blades toward one another, laterally oppositely (see arrows 14a and 14b in FIG. 1b), is shown at 15. That drive is also operable to retract the blades 13a and 13b away from one another.

Second and third cutter means are also provided, for sheathing stripping, and each may be considered to include multiple blades located for movement toward and away from the axis 12. See for example the second set of two blades 16a and 16b, and the third set of two blades 17a and 17b.

Blades 16a and 16b are located or considered to be controllably simultaneously displaced, as by drive 18, laterally oppositely, toward one another (see arrows 19a and 19b in FIG. 1d), the drive also operable to retract the blades 16a and 16b away from one another. Similarly, the blades 17a and 17b are located or carried to be controllably displaced, simultaneously, laterally oppositely toward one another (see arrows 20a and 20b in FIG. 1d), and drive 18 may be used for this purpose. Thus, blades 16a and 16b may be displaced toward one another at the same time and to the same extent as blades 17a and 17b are displaced toward another, as is clear from FIG. 1d. The latter shows that the blades 16a and 16b, and 17a and 17b, do not sever the wire but may closely approach the wire while cutting into sheathing 11 for stripping purposes.

Brief reference to FIGS. 9–11 show the blades 16a and 16b to have V-shape, as do wire severing blades 13a and 13b, and blades 17a and 17b. Note edges 16a' and 16a" and 16b' and 16b" (of blades 16a and 16b) cutting into the sheathing in FIG. 10a to approach the wire core from four sides for efficient stripping, while leaving the core uncut. Similar functioning of blade edges 17a' and 17a", and 17b' and 17b" also takes place, as in FIG. 1d.

FIG. 1a shows displacement of the wire axially endwise and longitudinally, as by a conveyor means 21a to the first position as shown. FIG. 1b shows the step of severing the wire thereby to form wire forward and rearward sections 10a and 10b, the blades 13a and 13b being advanced laterally to accomplish complete severing at locus 22, as shown. Note that wire forward section 10a has a rearward end portion 10aa; and the wire rearward section 10b has a forward end portion 10bb.

FIG. 1c shows the step of controllably separating the two sections 10a and 10b axially endwise oppositely, as to the positions shown, in which the end portions 10aa and 10bb are spaced from the closed-together blades 13a and 13b. Guides 24 and 25, provided between the blade sets, serve to accurately guide the wire and the sections 10a and 10b during the cutting and severing operation, as is clear from FIGS. 1a–1f. Note the tapered entrances 24a and 25a to the guides to receive and center the forwardly advanced wire.

Wire drives 21a and 21b are controllably operated to engage and separate the two sections 10a and 10b, as indicated in FIGS. 1a and 1c.

FIG. 1d shows a sub-step included within the step of stripping sheathing from the forward section rearward portion and from the rearward section forward portion thereby to expose wire ends at the portions. Note that blades 16a and 16b are simultaneously advanced laterally oppositely, as to blade edge positions described above as respects FIG. 10a, and as blades 17a and 17b are also simultaneously advanced laterally oppositely (as to the same extent if such stripping is to be equal for each wire section). Note that blades 13a and 13b now extend in laterally overlapping condition due to operation of drives 15 and 18 as one, i.e., equal rightward lateral displacement for blades 13a, 16a and 17a, and equal leftward lateral displacement for blades 13b, 16b and 17b; however, they may be separately driven so as not to extend in such relation, as shown. Blades 13a, 16a and 17a may be connected together to move rightwardly to equal extent; and blades 13b, 16b and 17b may also be connected together to move leftwardly as one, for extreme simplicity.

FIG. 1e shows operation of the wire drives to further endwise separate the wire sections 10a and 10b so as to pull or strip two sheathing end portions 11b' and 11b" from the wire sections 10a and 10b, thereby to expose the wire core end portions 11a' and 11a". The stripped sheathing end portions 11b' and 11b", or slugs, are allowed to drop out from between the pairs of guides 24 and 25 which may be split, as shown, to provide slug drop-out openings, and may be movable to facilitate such drop out.

FIG. 1f shows all blades laterally retracted and the wire rearward section 10b fully advanced into position corresponding to FIG. 1a position for controlled length endwise positioning to be processed, as in FIGS. 1b–1e to provide an exposed core end at its opposite end. Thus, controlled length wires (or cables), with exposed core lengths at each end of each wire, is efficiently and rapidly and controllably provided. See master control 35 to control all the driving, as described, and to be described.

Referring now to FIGS. 2–8, one form of apparatus to accomplish the above operations (FIGS. 1a–1f) is shown in detail. A frame is provided, as at 40–44 and 44a, to mount two conveyors 45 and 46, which may be considered as included within the wire drives 30 and 31, as mentioned. Such conveyors may include two rearwardly positioned endless belts 47 and 48, and two forwardly positioned endless belts 49 and 50. The belts provide stretches, as at 47' and 48', which are adapted to sidewise flatly grip the wire 10 (and specifically the wire rearward section 10b) for endwise advancement and retraction, as during separation of the sections 10a and 10b in FIG. 1c; and stretches 49' and 50' are adapted to sidewise grip the wire 10 (and specifically the wire forward section 10*a*) for endwise advancement and retraction.

Figure 4:
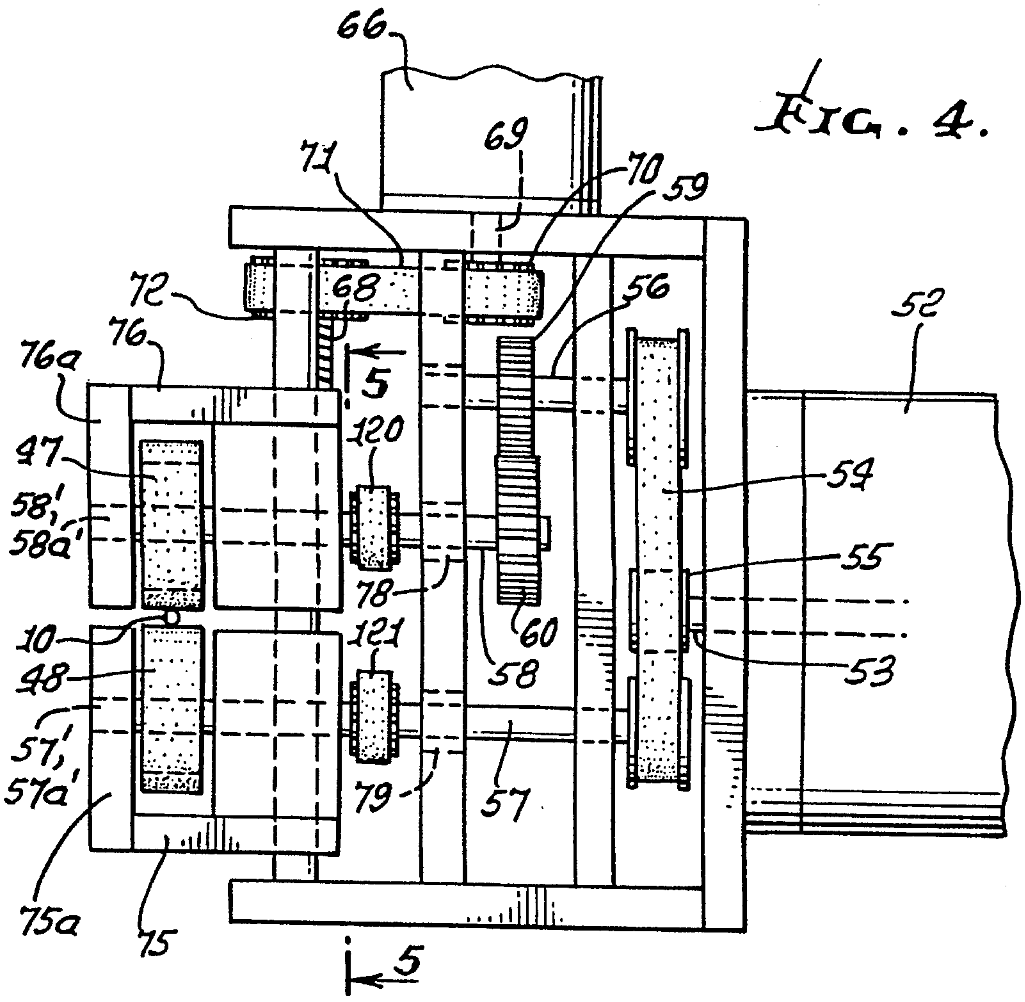
FIG. 4 is an end view, taken in elevation, showing wire belt displacing drive apparatus.

The belts 47 and 48 are driven to advance or retract the wire section 10*a* as from a drive motor 52 (see FIG. 4). The output shaft 53 of the motor drives belt 54, as via a pulley 55, and belt 54 drives shafts 56 and 57. Shaft 56 drives another shaft 58, through gearing 59 and 60, to drive shaft 58 and upper conveyor belt 47 clockwise; whereas lower shaft 57 and lower belt 48 are driven counterclockwise in FIG. 2. This drives the wire forwardly; whereas when motor 52 is reversed, the wire is driven rearwardly. Additional axles or shafts for the conveyor belts 47 and 48 appear at 58*a* and 57*a*.

FIG. 2 shows conveyor rotors 60 and 61, and 62 and 63. These carry the belts 47 and 48. Axles 58*a* and 57*a* are driven by drive belts 64 and 65 extending between pulleys on the shafts 58 and 58*a*, and 57 and 57*a*, as shown. Accordingly, when the belt stretches 47' and 48' are closed against opposite sides of the wire 10, and the motor 52 is operating, the wire is displaced endwise.

Means is provided to move the conveyor belt stretches 47' and 48' toward one another to clutch the wire, and away from one another to de-clutch the wire. See for example in FIGS. 3–5 the motor or drive 66 carried by a frame part 67 to rotate a vertical screw shaft 68, as via motor output shaft 69, pulley 70, belt 71, and pulley 72 on the screw shaft 68. The screw shaft has screw thread engagement at 73 and 74 with frame members 75 and 76. Frame member 76 supports the ends of shafts 58 and 58*a*, via member extension 76*a*, as at 58' and 58*a*'; whereas frame member 75 supports the ends of shafts 57 and 57*a*, via member extension 75*a*, as at 57' and 57*a*'. Screw threading interfit at 74 is oppositely "handed" relative to threading interfit at 73, so that when shaft 68 is rotated in one direction about its axis, the frame members 75 and 76 are displaced toward one another, whereby conveyor stretches 47' and 48' may clamp the wire; and when the shaft 68 is rotated in the opposite direction about its axis, the members 75 and 76 are displaced away from each other, and the wire is de-clutched.

The bearing supports at 78 and 79 for shafts 58 and 57 are made loose enough to accommodate such up/down movement of those shafts at the conveyor belt drive locations. Note also couplings at 110 and 111.

Tension springs 90 and 91 are provided (see FIG. 5) between fixed frame structure 92 and shoulders 76*a*' on 76*a* to yieldably urge the structures 76 and 76*a*, and the belt stretch 47' downwardly; and similarly, tension springs 93 and 94 are provided between fixed frame structure 95 and shoulder 75*a*' on 75 to yieldably urge the structure 75 and 75*a* and the belt stretch 48' upwardly. This provides clearance "take-up" for better control of wire gripping or clamping.

Figure 3:
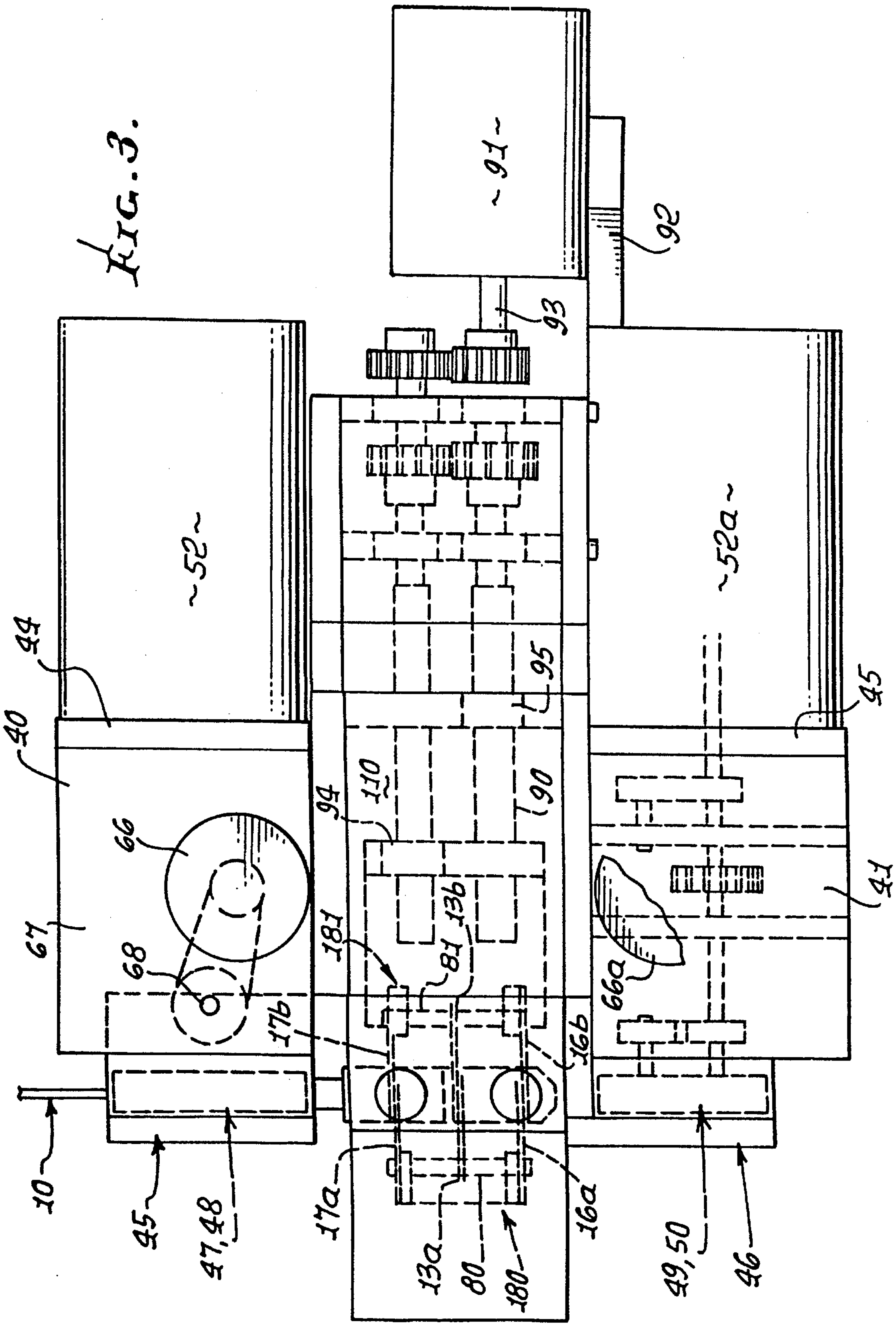
FIG. 3 is a top plan view showing the apparatus of FIG. 2.
Figure 5:
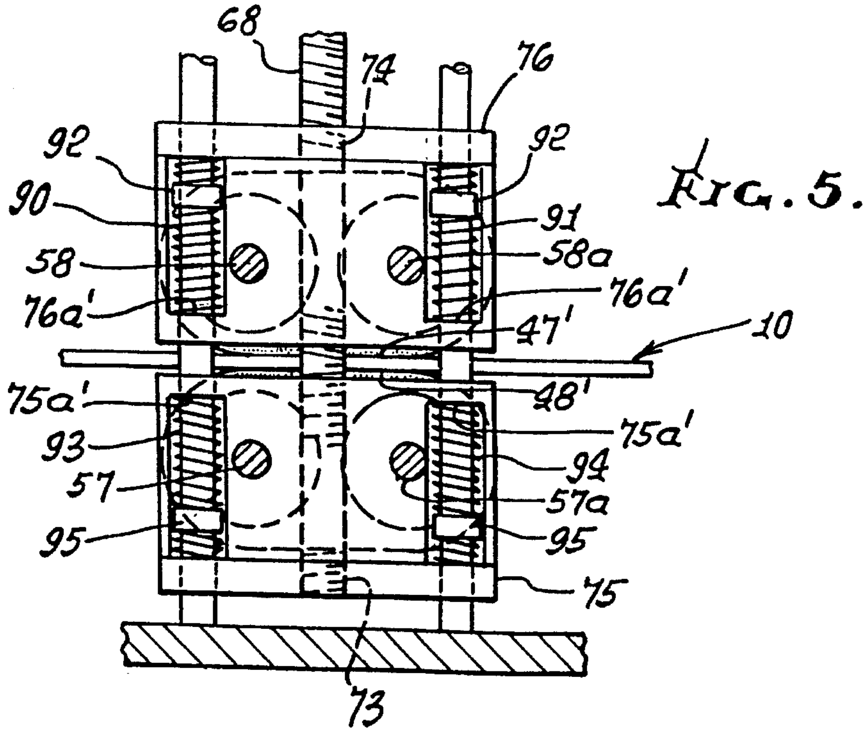
FIG. 5 is an elevation showing spring urging of wire drive belts.
Figure 6:
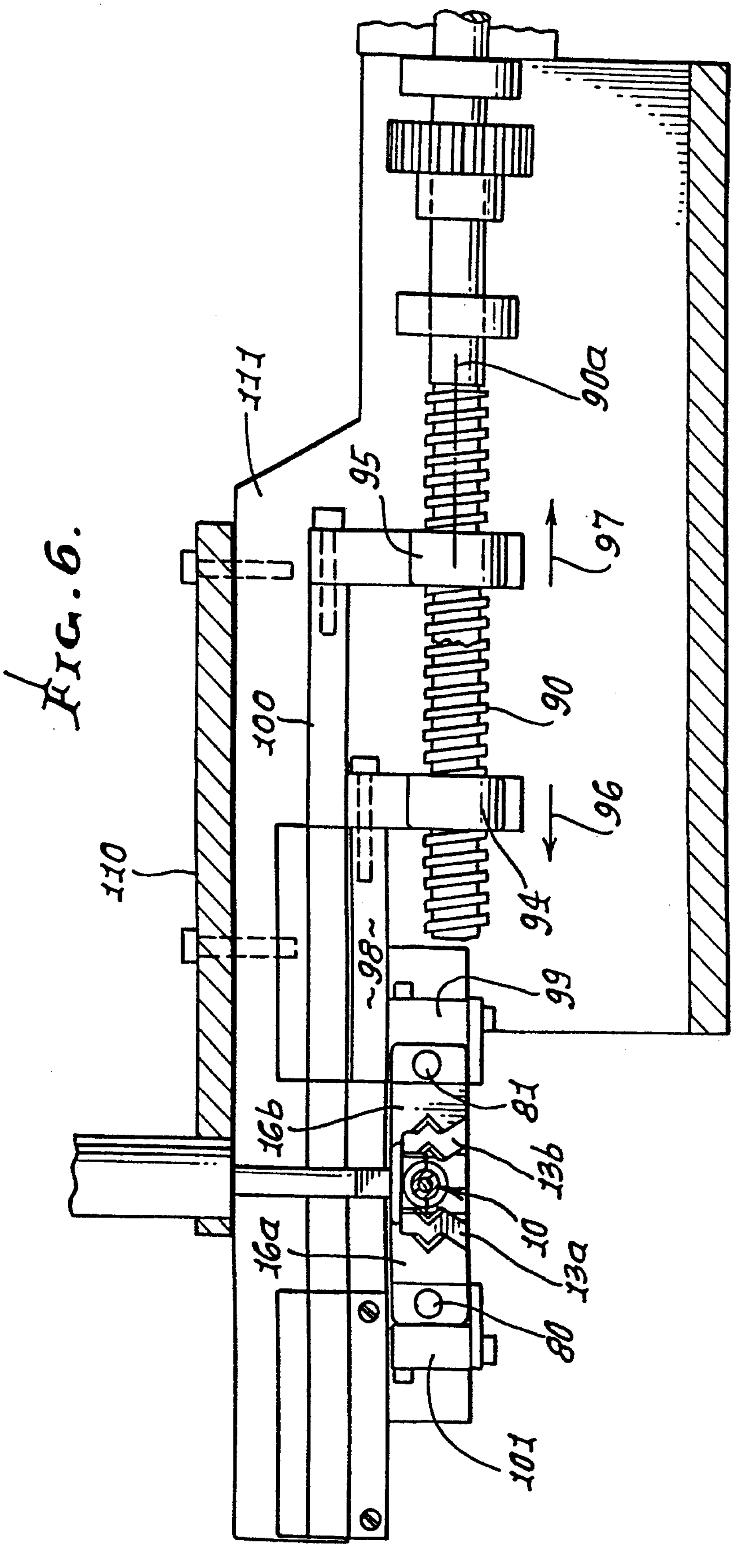
FIG. 6 is an enlarged cross-section taken in elevation to show sheathing stripping actuator structure.

The forward conveyor unit 46 embodies conveyor belt drive and up/down movement the same as described in connection with unit 45 in FIGS. 3–5. The drive motor 52*a* for driving the belt stretches 49' and 50' forwardly and reversely is seen in FIG. 3, as is the motor 66*a* to control belt clamping of the forward wire section. Mechanism between the motors 52*a* and 66*a*, and the respective forward conveyor belts 49 and 50, is the same as above described mechanism between motors 52 and 66 and the respective rearward conveyor belts 47 and 48; however, the motors 52 and 51*a* are typically operated simultaneously, either to drive the wire or wire sections forwardly, as in FIGS. 1*a* and 1*f*, or to drive the wire sections endwise oppositely, as in FIGS. 1*c* and 1*e*. A master control to control all drives, in a pre-programmed manner, is seen at 125.

Referring to FIG. 11, the wire severing blades 13*a* and 13*b* are fully laterally retracted, as are the wire sheathing stripping blades 16*a* and 16*b*. Blades 17*a* and 17*b* are in axial alignment with blades 16*a* and 16*b*, and are not shown. Note V-angled blade edges 13*a*' and 13*a*" and blade edges 13*b*' and 13*b*". The blades 13*a*, 16*a* and 17*a* at one side of the wire 10 are interconnected by axially extending carrier rod 80; and the blades 13*b*, 16*b* and 17*b* at the opposite ends of the wire are interconnected by axially extending carrier rod 81, laterally spaced from rod 80. Rods 80 and 81 are relatively movable laterally toward one another to effect wire severing, as by blades 13*a* and 13*b* (see FIG. 9 and also FIG. 1*b*). Rods 80 and 81 are further laterally movable toward one another to effect penetration of the blade edges 16*a*' and 16*a*", and 16*b*' and 16*b*" into the sheathing (as in FIGS. 10 and 10*a*), and as also seen in FIG. 1*d*. Thereafter, the wire forward and rearward sections 10*a* and 10*b* are separated as in FIG. 1*e* to endwise strip the slugs 10*aa* and 10*bb*, off the wire cores, as also seen in FIG. 11. Dropping of the slug is also seen in FIG. 11, as is lowering of a wire guide lower sector B of guide 11*b*", to release the slug. The upper guide sector is shown at A. A drive 130 is operable to lower and raise sector B.

Means to effect the described lateral movement of the blade carrier rods 80 and 81 in shown in FIGS. 3, and 6–8. As seen, a laterally extending lead screw 90 is rotatable by a drive motor 91, carried by frame part 83. See connecting shaft 93. As screw 90 rotates in one direction about its axis 90*a*, nuts 94 and 95 on the screw threads travel axially oppositely (see arrows 96 and 97) to move rod 80 to the right and rod 81 to the left, as in FIGS. 9 and 10. See connectors 98 and 99 connecting nut 94 with rod 81, and connectors 100 and 101 connecting nut 95 with rod 80. A pair of parallel lead screws 90 may be utilized for these purposes, as see in FIG. 8, each driven by the motor 91, with one lead screw associated with blades 16*a* and 16*b*, and the other associated with blades 17*a* and 17*b*. Balanced force transmission to the two sets of blades is thereby effected. See also frame elements 110–116 supporting the structure, as indicated. Bearings appear at 117 and 118. An additional tubular wire guide is seen at 119.

Referring now to FIGS. 13*a*–13*b*, the elements which correspond to those in FIGS. 1*a*)–1*f*) bear the same numerals. FIG. 13*a* corresponds to FIG. 1*c*; and FIG. 13*b* corresponds to FIG. 1*e*. In FIG. 13*b*, prior to the time the blades 16*a*, 16*b*, 17*a*, and 17*b* penetrate into the sheathing 11*b*, the wire sections 10*a* and 10*b* are displaced, endwise axially oppositely, to controlled extent as by drives 21*a* and 21*b*, under computer control, so as to control such displacement. See for example the displacements $d_1$. This in effect controls the length $l_1$ and $l_2$ of slugs of insulation 11*b*' and 11*b*", as between slug ends 11*c*' and 11*c*" and 11*d*' and 11*d*", ends 11*c*" and 11*d*" being adjacent, respectively, the cutters 16*a* and 16*b*, and 17*a* and 17*b* which penetrate and cut the insulation.

Thereafter, the blades 16*a* and 16*b*, and 17*a* and 17*b* penetrate into the sheathing, and wire sections 10*a* and 10*b* are displaced axially endwise oppositely (see arrows 200 and 201), to controlled extents $h_1$ and $h_2$ as by the computer-controlled drives 21*a* and 21*b*, to relatively displace the insulation slugs to positions shown in FIGS. 13*b*, 13*c* and 13*d*, wherein the slugs protectively overhang the cut ends 11*aa* and 11*bb* of wire core. This protects against fraying of ends of wire clustered strands as seen at 11*c* in FIGS. 13*b*–13*d*. The blades are then retracted, to leave the wire sections and slugs, as seen in FIG. 13*c*, the final product being seen in FIG. 13*d*. Note the exposed wire core extents 11*f* and 11*g* between the opposite end insulation slugs 11*b*' and 11*b*", and the main extent 11*j* of insulation. The slugs are held in position on the core by friction, and may be pulled off at time of wire use.

In the above, the cutters can be oriented to move horizontally, or vertically, or in other directions.

In FIGS. 14–16, the blade arrangements and operations are the same as in FIGS. 1*a*–1*f* and 13*a* and 13*b*, the blades moving vertically. Note in this regard the blade actuators 180 and 181, carrying rods 80 and 81 seen in FIGS. 9–12. Such actuators are also seen in FIGS. 3 and 8. Drives for the actuators are schematically indicated at 15' in FIG. 16. Wire 10 passing endwise through the blade region is guided by guides 124 and 125, corresponding to guides 24 and 25 in FIGS. 1*a*–1*f*. As in FIG. 11, a part of each guide is movable away from a slug of insulation formed by closing of the blades as described above. In this embodiment, the two guides have parts 124*a* and 125*a* that are swingable away from the wire axis—see the broken line position 124*a*' of guide part 124*a* in FIG. 14 for example. Guide parts that do not move away from the wire are indicated at 124*b* and 125*b*. A pin 127 pivotally attaches each part 124*a* and 125*a* to frame structure 128.

A reciprocating drive swings the part 124*a* to position 124*a*' and back, under the control of master control 35. That drive, for example, includes a motor 130, and linkage means, including interconnected links 131–134 operatively connected between the motor shaft 135" and the part 124*a*. A corresponding motor 130*a* and links 131*a*–134*a* are connected to part 125*a* to pivot same. Guide parts 124*a* and 125*a* have concave arcuate wire guide surfaces, as at 124*aa*.

Also provided is a pusher and drive therefor for displacing the pusher to bodily push against the side of the severed length of sheathing (slug) for ejecting same in operative conjunction with moving (pivoting) of the part 124*a*. See for example the reciprocating plunger 135, and its drive, connected to the same drive as used to pivot the part 124*a*.

In FIG. 14, the plunger 135 is connected to the linkage 133 and 132. See also FIG. 17 showing plunger 135 connected at 132*a* to link 132. The nose 135' of the plunger is shown pushing the wire slug 10*aa* to the left. A similar pusher is operated in conjunction with pivoting of wire guide part 125*a*. A wire guide opening appears at 140 in FIG. 14. Motors 130 and 130*a* operate in one direction (rotate 180°) and then operate in reverse (−180°) to drive the pushers and swingable guide parts.

Referring now to FIGS. 18*a*–18*f*, they correspond generally and respectively to FIGS. 1*a*–1*f*, insofar as successive blade positions in severing the wire 210 and stripping insulation therefrom are concerned. Thus, first cutter means includes the two wire-cutting blades 213*a* and 213*b* of a first set, located or carried for movement laterally toward and away from the wire axis 212. Second cutter means includes blades 216*a* and 216*b* located for movement toward and away from axis 212, for stripping sheathing from the wire at one axial side of blades 213*a* and 213*b*; and third cutter means includes blades 217*a* and 217*b* movable toward and away from axis 212, for stripping sheathing from the wire at the opposite axial side of blades 213*a* and 213*b*.

Blades 216*a* and 216*b*, and blades 217*a* and 217*b*, do not sever the wire, but closely approach the wire while cutting into sheathing 211, for stripping purposes. See FIGS. 18*d* and 18*e*. A drive 218 is connected at 218*a* to blades 213*a*, 216*a* and 217*a* to move them laterally and simultaneously toward and away from the wire; and a drive 219 is connected at 219*a* to blades 213*b*, 216*b* and 217*b* to move them laterally and simultaneously toward and away from the wire.

The blades are shown as thin, flat steel sheets, formed to have dovetailed tongue ends at $213a_1$, $216a_1$, $217a_1$, and at $213b_1$, $216b_1$, and $217b_1$. Such dovetailed ends are receivable in and gripped by dovetailed groove holders schematically indicated at 229 and 230, assuring ease of replacement of the blades, while also assuring positive gripping of the blades and their proper alignment.

Such holders 229 and 230 may be considered as parts of the drives 218*a* and 219*a*, respectively. The blades themselves have V-shaped cutting edges arranged in pairs in opposed relation. Thus, blades 213*a* and 213*b* have opposed V-shaped edges at $213a_2$ and $213b_2$, which sidewardly slidably overlap completely during wire severing (see FIG. 18*b*); blades 216*a* and 216*b* have opposed V-shaped edges at $216a_2$ and $216b_2$ which sidewardly slidably overlap to limited extent during sheathing stripping (see FIGS. 18*d* and 18*e*); and blades 217*a* and 217*b* have opposed V-shaped edges at $217a_2$ and $217b_2$ which sidewardly overlap to limited extent during sheathing stripping (see FIGS. 18*d* and 18*e*). Such opposed V-shapes of the cutting edges assure complete severing of the sheathing.

Figure 18A:
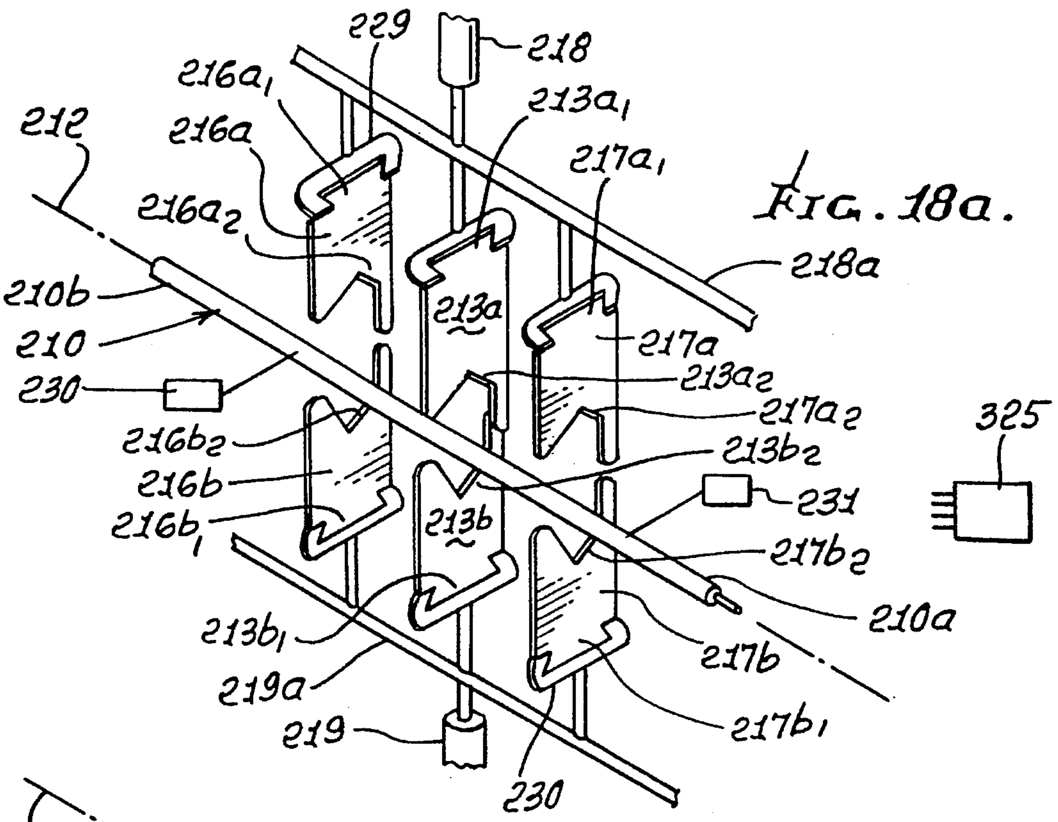
Figure 18B:
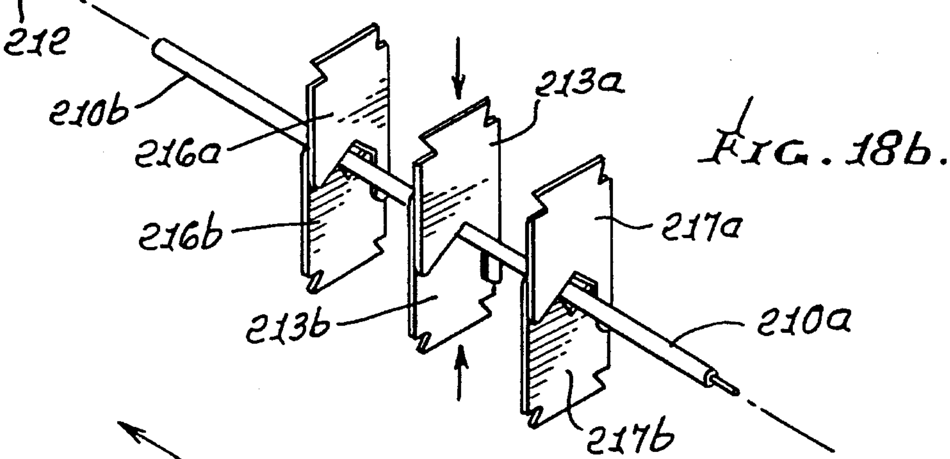

FIG. 18*a* shows wire 11 axially endwise advancement of the wire to first position. FIG. 18*b* shows the step of severing the wire thereby to form wire forward and rearward sections 210*a* and 210*b*, the blades 213*a* and 213*b* being advanced laterally toward the wire, from opposite sides, to accomplish severing.

Note that wire forward section 210*a* has a rearward end portion 210*aa*; and the wire rearward section 210*b* has a forward end portion 210*bb*.

Figure 18C:
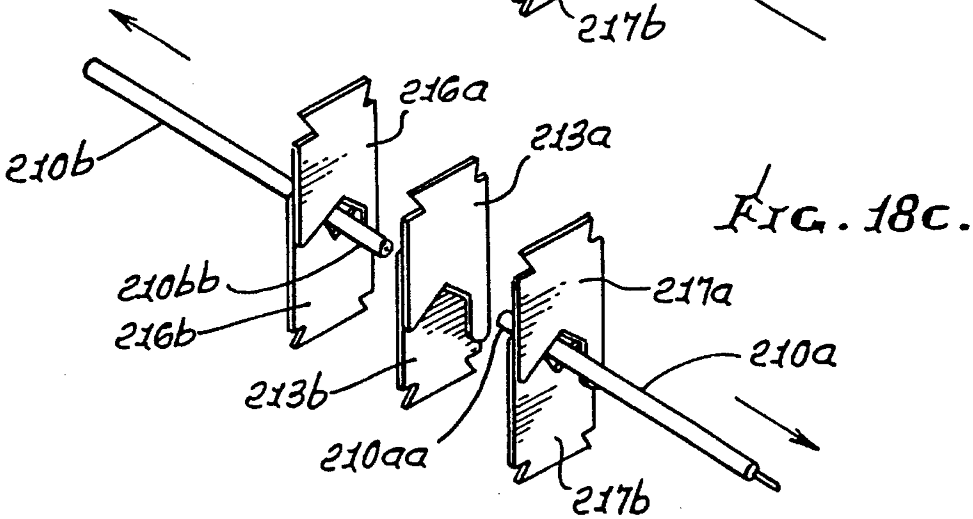

FIG. 18*c* shows the step of controllably separating the two sections 210*a* and 210*b* axially endwise oppositely, as to the positions shown, in which the end portions 210*aa* and 210*bb* are spaced from the closed-together blades 213*a* and 213*b*. Guides provided between the blade sets, serve to accurately guide the wire and the sections 210*a* and 210*b* during the cutting and severing operation. Such guides are seen for example in 524 and 525 in FIGS. 34, 35*a*, 35*b*, 35*c*, 37, 38, and 39. Note the tapered entrances 524*a* and 525*a* to the guides to receive and center the forwardly advanced wire.

Wire drives, schematically indicated at 230 and 231, are controllably operated to axially advance and separate the two wire sections 210*a* and 210*b*, as indicated in FIGS. 18*a* and 18*c*.

Figure 18D:
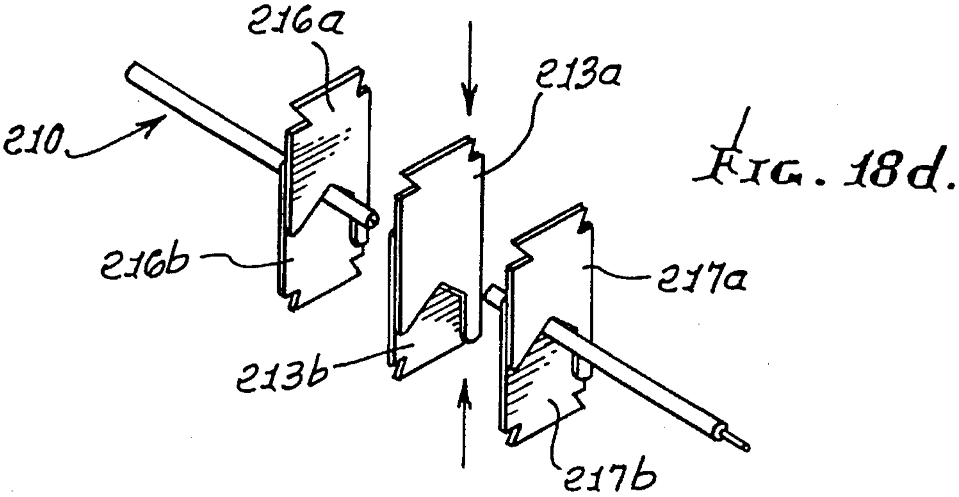

FIG. 18*d* shows a sub-step included within the step of stripping sheathing from the forward section rearward portion and from the rearward section forward portion thereby to expose wire ends at the portions. Note that blades 216*a* and 216*b* are simultaneously advanced laterally oppositely, as blades 217*a* and 217*b* are also simultaneously advanced laterally oppositely (and to the same extent if such stripping is to be equal for each wire section). Note that blades 213*a* and 213*b* now extend in laterally overlapping condition due to operation of blade drives 218 and 219 as one, i.e., equal downward lateral displacement for blades 213*a*, 216*b* and 217*b*, and equal upward lateral displacement for blades 213*b*, 216*b* and 217*b*; however, they may be separately driven so as not to extend in such relation, as shown. Blades 213*a*, 216*a* and 217*a* may be connected together to move downwardly to equal extent; and blades 213*b*, 216*b* and 217*b* are connected together to move upwardly as one, for extreme simplicity.

Figure 18E:
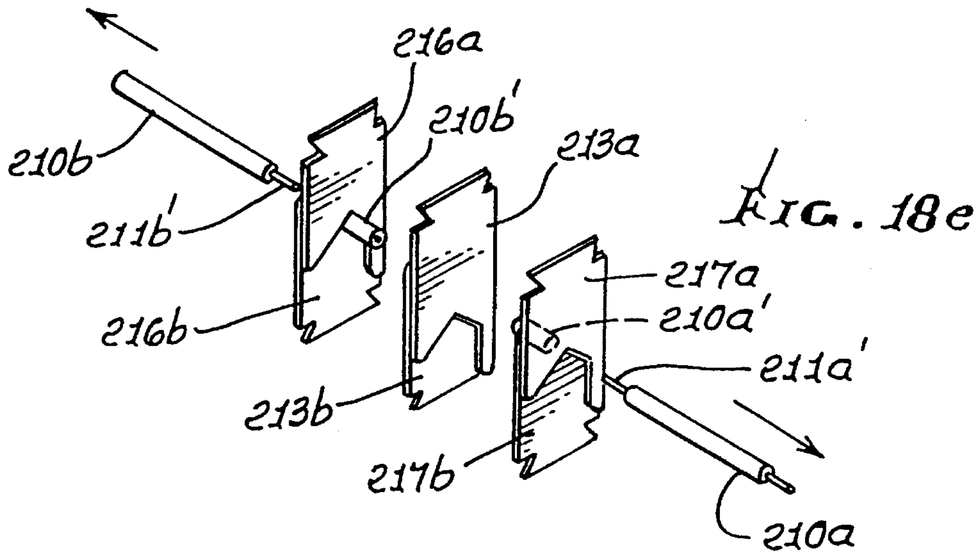

FIG. 18*e* shows operation of the wire drives 230 and 231 to further endwise separate the wire sections 210*a* and 210*b* so as to pull or strip two sheathing end portions 210*a*' and 210*b*' from the wire sections 210*a* and 210*b*, thereby to expose the wire core end portions 211*a*' and 211*b*'. The stripped sheathing end portions or slugs 210*a*' and 210*b*', are ejected, as will be seen, from between the pairs of guides 524 and 525 which may be shaped to provide for slug sideward de-confinement and ejection, as will be described further.

Figure 18F:
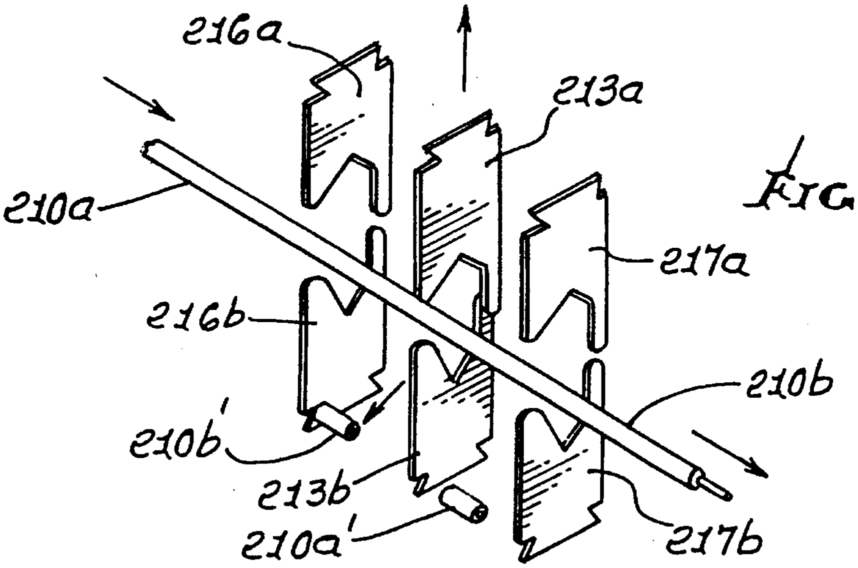

FIG. 18*f* shows all blades laterally retracted and the wire rearward section 210*b* fully advanced into position corresponding to FIG. 1*a* position for controlled length, endwise positioning to be processed, as in FIGS. 18*b*–18*e* to provide an exposed core end at its opposite end. Thus, controlled length wires (or cables), with exposed core lengths at each end of each wire, are efficiently and rapidly and controllably provided. See master control 325 to control all the drives, as described, and to be described.

Referring to FIGS. 19–25, apparatus to perform the operations described as respects FIGS. 18*a*–18*f* is shown in detail. A frame is provided as at 240–244 and 244*a* to mount conveyors, as represented by roller groups 245 and 246. These may be regarded as included within the wire drives 230 and 231, as mentioned. Such conveyors may include two rearwardly positioned endless belts 247 and 248; and two forwardly positioned endless belts 249 and 250. The belts 247 and 248 provide stretches, as at 247' and 248', which are adapted to sidewise flatly grip the wire or cable 210 (and specifically section 210*b*) for endwise advancement and retraction, as during separation of the wire sections 210*a* and 210*b* in FIG. 18*c*. Likewise, stretches 249' and 250', provided by belts 249 and 250, are adapted to sidewise grip the wire or cable 210 (and specifically the forward wire section 210*a*) for endwise advancement and retraction.

Belts 249 and 250 are driven to advance or retract the wire section 210*a*, as from a drive motor 252 (see FIG. 20). The output shaft 253 of the motor drives belt 254, as via a sprocket 255, and belt 254 drives shaft 256. Sprocket 255 also drives a belt 254*a*, which drives a shaft 257 via a pulley 257*a*. Shaft 256 drives another shaft 258, as via angular reversing gearing 259 and 260, in order to drive shaft 258, shaft 258' and upper conveyor belt 249 counterclockwise; whereas lower shaft 257, shaft 257' and lower conveyor belt 250 are driven clockwise, in FIG. 19. The conveyor belts drive the wire endwise in one axial direction; whereas, when the motor 252 is reversed, the wire is driven endwise in the opposite axial direction.

FIG. 22 shows additional coupling 410 between offset shafts 258 and 258', and coupling 411 between offset shafts 257 and 257'. Such couplings include the timing belts 412 and 413, and timing gears 414 and 415, and 416 and 417, as shown. Shafts 257 and 258 are typically not pivotable (to swing bodily); whereas shafts 257' and 258' may pivot, in effect, as their support plates 418 and 419 are moved up and down as lead screw 268 rotates. See the horizontal lost-motion, connection-type bearing supports 418' and 419' for those shafts in FIG. 22. This allows the conveyor belt stretches 249' and 250' to be flatly and adjustably engaged and disengaged with the wire or cable 210, as seen in FIG. 22. See also FIG. 21.

FIG. 19 also shows conveyor rotors 260 and 261, and 262 and 263. These carry the belts 249 and 250. Axle 258" for rotor 261 is suitably driven by axle 258', as via a belt and pulleys; and axle 257" is suitably driven by axle 257', as via a belt and pulleys (see in FIG. 2 drive belts 14 and 15, etc.). Accordingly, when the belt stretches 249' and 250' are closed against the opposite sides of the wire 210*b*, and the motor 252 is operating, the wire is displaced endwise. Similar drives for conveyors 247 and 248 are provided, as shown.

Means is provided to move the conveyor belt stretches 249' and 250' relatively toward one another to clutch the wire, and away from one another to de-clutch the wire. See for example in FIGS. 19–21 the motor or drive 266 carried by a frame part 241 to rotate a vertical lead screw shaft 268, as via motor output shaft 269, sprocket 270, timing belt 271, and sprocket 272 on shaft 268. The screw shaft has screw thread engagement at 273 and 274 with nut members 275 and 276, associated respectively with plates 418 and 419.

Plate 418 supports the end of shaft 258', for up and down movement; and plate 419 supports the end of shaft 257' for up and down movement. Support of such shaft ends is via the lost-motion connections described above at 418' and 419'. Screw threaded connection to the nut 275 is oppositely "handed" relative to threaded connection to nut 276, so that when shaft 268 is rotated in one direction about its axis, the nuts 275 and 276, and plates 418 and 419 (and shafts 257' and 258') are yieldably displaced toward one another, whereby conveyor stretches 249' and 250' may clamp the wire; and when the shaft 268 is rotated in the opposite direction about its axis, the nuts and plates are yieldably displaced away from one another, and the wire is de-clutched. Nuts 275 and 276 are confined in vertical slots 275' and 276' in plates 418 and 419, allowing relative movement between the nuts and plates.

Compression springs 290 and 291 are provided (see FIGS. 22) between the nuts and the supports 418 and 419 to yieldably urge the supports 418 and 419 toward one another, in response to lead screw 268 rotation in one direction, to provide clearance "take-up" for better control of wire gripping, especially for smaller diameter wires. Those springs engage shoulders 418*a* and 419*a*, as shown. Additional compression springs 290*a* and 291*a* are provided between the nuts and shoulder 418*b* and 419*b* to yieldably urge the plates and shafts apart as the lead screw rotates in the opposite angular direction. Similar structures are associated with the conveyors 247 and 248, and bearing the same identifying numbers.

The rearward conveyor unit 245 embodies conveyor belt drive, and up/down movement the same as described in connection with unit 246 in FIGS. 19–22. The drive motor 252*a* (not shown) for driving the belt stretches 247' and 248' forwardly and reversely is similar to motor 252, and corresponds to motor 66 in FIGS. 2. The motor to control belt clamping of the wire is seen at 266*a* in FIG. 19. Mechanism operation between such rearward motors and the respective belts 247 and 248 is the same as mechanism between motors 266 and 252, and belts 249 and 250. The forward and rearward belt motors 252 and 252*a* are typically operated simultaneously, either to drive the wire or wire sections forwardly, as in FIGS. 18*a* and 18*f*, or to drive the wire sections endwise oppositely, as in FIGS. 18*c* and 18*e*. A master control to control all drives in a predetermined manner is seen at 325, in FIG. 18*a*.

In FIGS. 25, 30 and 31, blades 213*a*, 216*a*, and 217*a* at the upper side of the wire are interconnected, as by the laterally extending blade holder 280, and the blades 213*b*, 216*b* and 217*b* at the lower side of the wire are interconnected by laterally extending blade holder 281, vertically spaced from holder 280. Those holders are vertically movable toward one another to effect wire severing, as by V edges of blades 213*a* and 213*b*. Those holders are further movable toward one another to effect penetration into the sheathing of the edges of blades 216*a*, 216*b*, and 217*a* and 217*b*. Thereafter, the wire forward and rearward sections 210*b* and 210*a* are separated, axially, as in FIG. 18*e*, to endwise strip the insulation tubular slugs off the wire cores, a typical slug 210*aa* being ejected, as in FIG. 35*c*. That view also shows dropping of the ejected slug, away from the mechanism.

Means to effect the described lateral movement of the blade holders 280 and 281 is shown in FIGS. 19, 25 and 30. As seen, a vertical lead screw 290 is rotatable by a drive motor 291, carried by drive structure 292*a*–292*c*. Screw 290 bearings are indicated at 290*a*. Belt and pulley elements 501–503 connect motor 291 to the screw. As screw 290 rotates in one direction about its axis, nuts 294 and 295 on the screw threads travel axially oppositely along the screw to move blade holder 280 down and holder 281 upwardly. See sliding blocks 298 and 299 connecting holder 280 with nut 294, and holder 281 with nut 295. Block bearings 298*a* and 299*a* slide along guide rods 310, carried by frame structure 292*a* and 292*c*.

In FIGS. 31–33, the blade holder 280 is held in interengagement at 311 with the block 298 by a clamp 312, which engages the front side of the holder at 313. A fastener 314 attaches the clamp to the block 298. Dovetailed tongue end 216*a*' of blade 216*a* has one angled edge surface $216a_1$', engaged with correspondingly dovetailed surface $280a_1$, for retention. A retainer in the form of a shaft 420 has an interior flat surface 420*a* rotatable into corresponding engagement with the oppositely angled surface $216a_2$' of the blade, thereby to retain and locate the blade, vertically. Set screws 420*a* keep shaft 420 from rotating.

FIGS. 31 and 33 also show the dovetailed portions of three blades fitting in position, as in vertical slots 415–417 defined by a blade clamp bar or bars 419. Screws 426 attach bar or bars 419 to blade holder 280. Magnets 427, carried by the block 298, are positioned to magnetically attract vertical edge portions of the blades (as at 216*d* in FIG. 31) to keep the three blades positioned as they are initially received in slots 415–417, and prior to rotation of shaft 420, as described, into FIG. 31 position, to positively hold the blades. Shaft 420 has end extents 420*c* and 420*d* carried in bearing openings 431 and 432 in holder 280 parts 280*f* and 280*g*. See also manually rotatable handle 433 on shaft 420. Reverse rotation of shaft 420 allows quick, manual frontward reversal, and replacement of the blades.

Referring now to FIGS. 26–29, 34, 35*a*–35*c*, and 36, structure is shown that serves to guide the wire during its axial movement relative to the blades, and to facilitate removal of a severed slug or slugs or insulation or sheathing material.

In FIG. 34, wire passing in horizontal direction 500 through the blade region is guided by two guides generally indicated at 524 and 525. A part of each guide is movable away from a slug of insulation formed by closing of the blades, and wire retraction, as described above. As shown, the two guides have parts 524*a* and 525*a* that are swingable laterally and upwardly, away from the wire axis, as better seen in FIG. 35*c*.

Guide part 524*a* is pivotally connected at 550 to blade holder 280, to swing about horizontal axis 550*a* extending parallel to the direction of wire advancement. Part 524*a* may be considered as a trap door, in the sense that when swung to FIGS. 35*c* and 35*a* positions, it has swung away from the side of the wire slug, leaving the slug free for ejection. Part 524*a* forms a semi-circular guide surface 524*a*' that guides the wire 210 when the part 524*a* is in closed position, as seen in FIG. 35*b*. Part 525*a* of guide 525 has construction and operation the same as described for part 524*a*.

The guides 524 and 525 also incorporate parts 524*b* and 525*b* which act as pushers, to bodily push against the sides of the severed lengths (slugs) of sheathing, for ejecting same laterally, in cooperative conjunction with pivoting movement of parts 524*a* and 525*a*, as described. Thus, part 524*b* is pivotally connected at 553 to blade holder 280, to swing about horizontal axis 553*a*, extending parallel to the direction of wire advancement.

Part 524*b* may be considered as a pusher or ejector, in the sense that, as seen in FIG. 35*c*, it bodily ejects or displaces the wire slug 211*b*' laterally and downwardly, positively and assuredly away from the mechanism, immediately after the trap door part 524*a* opens (swings to the position seen in FIG. 35*c*). Part 524*b* has a semi-circular guide surface 524*b*' that guides the wire 210 when parts 524*a* and 524*b* are in closed positions, as seen in FIG. 35*b*.

Part 525*b* of guide 525 has a construction and operation the same as described for part 524*a*. Parts 524*a* and 524*b* lie between glades 216*a* and 216*b*, and blades 213*a* and 213*b*; and parts 525*a* and 525*b* lie between blades 213*a* and 213*b*, and blades 217*a* and 217*b*, as is seen from FIG. 34.

The trap door parts 524*a* and 524*b*, and pusher parts 524*b* and 525*b*, have associated reciprocating drives, to open and close them in timed relation, as described. See for example in FIGS. 35*a*–35*c* the links 556 and 557, respectively, pivotally connected with parts 524*a* and 524*b*, as at 556*a* and 557*a*, the links passing through guide openings 558 and 559 in the blade holder structure.

FIGS. 28 and 29 show link 556 driven by a motor 560, as via crank arm 561 connected to the motor shaft 560*a*, link 562 extending from 561 to a slider 563, and that slider also connected to link 557. Frame part 565 carries the motor. Link 557 is also driven by motor 560, as via crank arm 561, link 558 extending away from 561 to a slider 559', and that slider connected to link 557. Guide posts for the sliders appear at 563*a* and 559*a*. See also FIG. 29.

FIG. 34 shows corresponding actuating link 556' for the trap door part 524*a*, and link 557' for the pusher part 524*b*, these operated in the same way as links 556 and 557.

Finally, a sensor is provided to sense arrival of the wire endwise in proximity to the trap door parts and to the pusher elements, as described. See sensor 569 in FIG. 19.

FIGS. 34 and 40 show a tapered, tubular guide 570 at which the advancing wire end arrives after traversing the blade region.

In FIG. 40, the sensor takes the form of a very lightweight, swingable door 571 extending across the wire path, and hinged at 572 to swing forwardly upwardly in response to engagement by the traveling wire 210*b* forward end 210*b*'. Such swinging movement is sensed, as by an optical sensor. The latter typically includes a light beam (electromagnetic wave) source 574 producing a beam sensed at 575, such sensing occurring for example when the beam is interrupted by door swinging. This serves to notify the operator that the wire end has arrived at the sensor position, i.e., the wire has traversed the blade zone. For example, the sensor at 575 in FIG. 42 may control drive 325, so as to stop the advancement of the wire conveyors 249 and 250. See circuit connections 576 and 577.

An alternate position for the door is shown at 571', in closer proximity to the conveyor means 249 and 250.

I claim:

1. In a system for marking elongated wire and for cutting the wire and stripping insulation therefrom, the combination comprising a) first means operable to mark the wire, b) second means operable to cut the marked wire and to strip insulation from the wire, c) the wire extending between and movable between said first and second means, there being endless conveyor means operable to move the wire between said first and second means, said first and second means comprising separate stand-alone devices, d) and control means operatively connected with said first and second means for controlling operation of said first and second means in time sequence relation to wire movement therebetween, and characterized in that changes in timing of markings by operation of said first means can occur while said second means operates to complete cutting and severing of wire associated with prior markings, thereby to reduce or eliminate wire waste.

2. The combination of claim 1 wherein said control means includes a computer located at a station relative to which said first and second means are movable.

3. The combination of claim 1 wherein said control means is located externally of said first and second means.

4. The combination of claim 1 wherein said control means comprises a programmed computer.

5. The combination of claim 4 wherein said control means includes circuitry to transmit command signals and status signals between said first and second means.

6. The combination of claim 1 wherein said first means includes a microprocessor to control marking of the wire, said control means connected with said microprocessor.

7. The combination of claim 1 wherein said control means includes circuitry to transmit command signals and status signals between said first and second means.

8. The combination of claim 3 wherein said control means includes circuitry to transmit command signals and status signals between said control means and said first means between said control means and said second means.

9. The combination of claim 1 wherein said wire has markings thereon and spaced at intervals along the wire length between said first means and second means, said markings produced by said first means.

10. The combination of claim 9 wherein said wire includes sections cut by said second means, and at locations between said markings.

11. The combination of claim 1 wherein said first means is positioned at a location from which said wire is moved by said conveyor means toward said second means.

12. The combination of claim 9 wherein said first means is positioned at a location from which said wire is moved by said conveyor means toward said second means.

13. The combination of claim 1 including drive means for causing said conveyor means to interruptedly drive the wire.

14. The combination of claim 9 wherein said control means includes circuitry to store command information to produce successive spaced markings on the wire at times $t_1$ and $t_2$ by said first means, and to store command information to produce delayed cutting of the wire by said second means and between said spaced markings, at time $t_3$, where $t_3$ is after $t_1$ and $t_2$.

15. The combination of claim 13 wherein said control means includes circuitry to store command information to produce successive spaced markings on the wire at times $t_1$ and $t_2$ by said first means, and to store command information to produce delayed cutting of the wire by said second means and between said spaced markings, at time $t_3$, where $t_3$ is after $t_1$ and $t_2$, and said control means includes circuitry to control driving of the wire at a rate to bring said space between said markings into position for wire cutting at $t_3$.

16. The combination of claim 13 wherein said control means stores a signal or signals causing said first and second means to mark and cut the wire simultaneously.

17. The combination of claim 1 wherein said first means includes a wire marker and an actuator to cause said marker to mark the wire, and said second means includes a wire cutter and an actuator to displace the cutter to cut the wire.

18. The combination of claim 17 wherein said control means is operatively connected with said actuators.

19. In a system for marking elongated wire and for cutting the wire and stripping insulation therefrom, the combination comprising a) first means operable to mark the wire, b) second means operable to cut the marked wire and to strip insulation from the wire, c) the wire extending between and movable between said first and second means, there being endless conveyor means operable to move the wire between said first and second means, said first and second means comprising separate devices, d) and control means operatively connected with said first and second means for controlling operation of said first and second means in time sequence relation to wire movement therebetween, e) said control means including programmable means to control operation of said second means to in turn control insulation. strip length, f) said control means including circuitry operable to prevent wastage of marked wire.

20. In a system for marking elongated wire and for cutting the wire and stripping insulation therefrom, the combination comprising a) first means operable to mark the wire, b) second means operable to cut the marked wire and to strip insulation from the wire, c) the wire extending between and movable between said first and second means, there being endless conveyor means operable to move the wire between said first and second means, said first and second means comprising separate devices, d) and control means operatively connected with said first and second means for controlling operation of said first and second means in time sequence relation to wire movement therebetween, e) said control means including programmable means to control said first means for marking the wire, f) said control means including circuitry operable to prevent wastage of marked wire.

21. In a system for marking elongated wire and for cutting the wire and stripping insulation therefrom, the combination comprising a) first means operable to mark the wire, b) second means operable to cut the marked wire and to strip insulation from the wire, c) the wire extending between and movable between said first and second means, there being endless conveyor means operable to move the wire between said first and second means, said first and second means comprising separate devices, d) and control means operatively connected with said first and second means for controlling operation of said first and second means in time sequence relation to wire movement therebetween, e) said control means including programmable means to control said second means for cutting the wire, f) said control means including circuitry operable to prevent wastage of marked wire.

22. In a system for marking elongated wire and for cutting the wire and stripping insulation therefrom, the combination comprising a) first means operable to mark the wire, b) second means operable to cut the marked wire and to strip insulation from the wire, c) the wire extending between and movable between said first and second means, there being endless conveyor means operable to move the wire between said first and second means, said first and second means comprising separate devices, d) and control means operatively connected with said first and second means for controlling operation of said first and second means in time sequence relation to wire movement therebetween, e) said control means including programmable means including memory means to store data associated with at least two programs for controlling said first and second means, f) said control means including circuitry operable to prevent wastage of marked wire.

23. The combination of claim 22 including means controlled by said control means for attaching terminals to wire cut ends produced by operation of said second means.

24. In a system for marking elongated wire and for cutting the wire and stripping insulation therefrom, the combination comprising a) first means operable to mark the wire, b) second means operable to cut the marked wire and to strip insulation from the wire, c) the wire extending between and movable between said first and second means, there being endless conveyor means operable to move the wire between said first and second means, said first and second means comprising separate devices, d) and control means operatively connected with said first and second means for controlling operation of said first and second means in time sequence relation to wire movement therebetween, e) said control means including programmable means including memory means to store data associated with at least two programs for controlling said first and second means, and f) said control means including circuitry for controlling the time sequence of the operation of said first and second means so that no wire is wasted when changing from one program to another.

25. In a system for marking elongated wire and for cutting the wire and stripping insulation therefrom, the combination comprising a) first means operable to mark the wire, b) second means operable to cut the marked wire and to strip insulation from the wire, c) the wire extending between and movable between said first and second means, there being endless conveyor means operable to move the wire between said first and second means, said first and second means comprising separate devices, d) and control means operatively connected with said first and second means for controlling operation of said first and second means in time sequence relation to wire movement therebetween, e) said control means including means to store data associated with at least two programs for controlling said first and second means, to control operation of said second means to in turn control insulation strip length, and to control operation of said first means to in turn control the distance between the marks on the wire and to produce at least two different programmed distances between marks on a single wire.

26. In a system for marking elongated wire and for cutting the wire and stripping insulation therefrom, the combination comprising a) first means operable to mark the wire, b) second means operable to cut the marked wire and to strip insulation from the wire, c) the wire extending between and movable between said first and second means, there being endless conveyor means operable to move the wire between said first and second means, said first and second means comprising separate devices, d) and control means operatively connected with said first and second means for controlling operation of said first and second means in time sequence relation to wire movement therebetween, e) said control means including means to store data associated with at least two programs for controlling said first and second means, and to control operation of said first means to in turn control the distance between the marks on the wire, f) and said control means including means for controlling the time sequence of the operation of said first and second means so that no wire is wasted when changing from one program to another.

27. In a system for marking elongated wire and for cutting the wire and stripping insulation therefrom, the combination comprising a) first means operable to mark the wire, b) second means operable to cut the marked wire and to strip insulation from the wire, c) the wire extending between and movable between said first and second means, there being endless conveyor means operable to move the wire between said first and second means, said first and second means comprising separate devices, d) and control means operatively connected with said first and second means for controlling operation of said first and second means in time sequence relation to wire movement therebetween, e) said control means including means to store data associated with at least two programs for controlling said first and second means, and to control operation of said first means to in turn control the selection of characters to be marked on the wire.

28. In a system for marking elongated wire and for cutting the wire and stripping insulation therefrom, the combination comprising a) first means operable to mark the wire, b) second means operable to cut the marked wire and to strip insulation from the wire, c) the wire extending between and movable between said first and second means, there being endless conveyor means operable to move the wire between said first and second means, said first and second means comprising separate devices, d) and control means operatively connected with said first and second means for controlling operation of said first and second means in time sequence relation to wire movement therebetween, e) said control means including means to store data associated with at least two programs for controlling said first and second means, to control operation of said first means to in turn control the distance between the marks on the wire, and to control operation of said first means to in turn control the selection of characters to be marked on the wire.

29. In a system for marking elongated wire and for cutting the wire and stripping insulation therefrom, the combination comprising a) first means operable to mark the wire, b) second means operable to cut the marked wire and to strip insulation from the wire, c) the wire extending between and movable between said first and second means, there being conveyor means sidewise engageable with the wire and operable to move the wire between said first and second means, said first and second means comprising separate devices, d) and control means operatively connected with said first and second means for controlling operation of said first and second means in time sequence relation to wire movement therebetween, e) said control means including means to store data associated with at least two programs for controlling said first and second means, to control operation of said first means to in turn control the distance between the marks on the wire and to produce at least two different programmed distances between marks on a single wire, and to control operation of said first means to in turn control the selection of characters to be marked on the wire.

30. In a system for marking elongated wire and for cutting the wire and stripping insulation therefrom, the combination comprising a) first means operable to mark the wire, b) second means operable to cut the marked wire and to strip insulation from the wire, c) the wire extending between and movable between said first and second means, there being conveyor means sidewise engageable with the wire and operable to move the wire between said first and second means, said first and second means comprising separate devices, d) and control means operatively connected with said first and second means for controlling operation of said first and second means in time sequence relation to wire movement therebetween, e) said control means including means to control operation of said second means to in turn control insulation strip length, and to control operation of said first means to in turn control the selection of characters to be marked on the wire.

31. In a system for marking elongated wire and for cutting the wire and stripping insulation therefrom, the combination comprising a) first means operable to mark the wire, b) second means operable to cut the marked wire and to strip insulation from the wire, c) the wire extending between and movable between said first and second means, there being conveyor means sidewise engageable with the wire and operable to move the wire between said first and second means, said first and second means comprising separate devices, d) and control means operatively connected with said first and second means for controlling operation of said first and second means in time sequence relation to wire movement therebetween, e) said control means including means to control operation of said first means to in turn control the selection of characters to be marked on the wire.

32. The combination of claim 28 wherein said control means including computer means operable to prevent wastage of marked wire.

33. The combination of claim 32 including means controlled by said control means for attaching terminals to wire cut ends produced by operation of said second means.

* * * * *

UNITED STATES PATENT AND TRADEMARK OFFICE

CERTIFICATE OF CORRECTION

PATENT : 5,539,967

DATED : July 30, 1996

INVENTOR(S) : Greg Nazerian, et al

It is certified that error appears in the above-identified patent and that said Letters Patent is hereby corrected as shown below:

On the title page, item [63] Related U.S. Application Data, first line serial no. "225,913" should read --225,813--.

Signed and Sealed this

Sixteenth Day of January, 2001

*Attest:*

Q. TODD DICKINSON

*Attesting Officer*

*Commissioner of Patents and Trademarks*